United States Patent
Kim

(10) Patent No.: US 8,228,567 B2
(45) Date of Patent: Jul. 24, 2012

(54) MULTI-FUNCTIONAL DEVICE HAVING SCANNER MODULE AND IMAGE SCANNING APPARATUS EMPLOYING THE SCANNER MODULE

(75) Inventor: Kyung-rok Kim, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 529 days.

(21) Appl. No.: 12/170,922

(22) Filed: Jul. 10, 2008

(65) Prior Publication Data

US 2009/0015883 A1 Jan. 15, 2009

(30) Foreign Application Priority Data

Jul. 11, 2007 (KR) ........................ 10-2007-0069502

(51) Int. Cl.
H04N 1/04 (2006.01)

(52) U.S. Cl. ........ 358/475; 358/484; 358/483; 358/482; 358/497; 358/474

(58) Field of Classification Search ................... 358/484, 358/475, 509, 483, 482, 512–514, 505, 474, 358/497; 250/216, 227.11, 208.1, 578.1; 355/67–70; 362/800, 611–613, 615, 551; 399/220, 221
See application file for complete search history.

(56) References Cited

U.S. PATENT DOCUMENTS

| | | | |
|---|---|---|---|
| 5,483,053 A * | 1/1996 | Johnson et al. | 250/226 |
| 5,850,585 A * | 12/1998 | Tsutsumi et al. | 399/128 |
| 5,905,583 A | 5/1999 | Kawai et al. | |
| 6,014,232 A * | 1/2000 | Clarke | 358/482 |
| 6,127,675 A | 10/2000 | Nakamura et al. | |
| 6,206,534 B1 | 3/2001 | Jenkins et al. | |
| 6,295,141 B1 | 9/2001 | Ogura et al. | |
| 6,326,602 B1 | 12/2001 | Tabata | |
| 6,360,030 B1 | 3/2002 | Kawai et al. | |
| 6,512,600 B1 | 1/2003 | Kawai et al. | |
| 6,540,377 B1 | 4/2003 | Ota et al. | |
| 6,816,624 B1 * | 11/2004 | Ebisawa et al. | 382/275 |
| 7,042,599 B2 * | 5/2006 | Yokota et al. | 358/475 |
| 7,071,616 B2 | 7/2006 | Shimizu et al. | |
| 7,333,249 B2 * | 2/2008 | Sawada | 358/484 |
| 7,538,911 B2 | 5/2009 | Sakurai et al. | |
| 7,548,352 B2 | 6/2009 | Sakurai et al. | |
| 7,864,381 B2 * | 1/2011 | Scott | 358/474 |

(Continued)

FOREIGN PATENT DOCUMENTS

EP 0874517 10/1998

(Continued)

OTHER PUBLICATIONS

English language abstract of JP 2004-170858, published Jun. 17, 2004.

(Continued)

*Primary Examiner* — Cheukfan Lee
(74) *Attorney, Agent, or Firm* — Stanzione & Kim, LLP

(57) ABSTRACT

A scanner module comprises an illuminator configured to illuminate a document by emitting light onto the document. The illuminator comprises a light source configured to emit the light and a light guide unit configured to guide the light emitted from the light source to illuminate at least two areas on the document, the center positions of the at least two areas on the document being spaced apart from each other.

27 Claims, 23 Drawing Sheets

U.S. PATENT DOCUMENTS

| | | | |
|---|---|---|---|
| 2003/0189827 A1 | 10/2003 | Cheng | |
| 2005/0150956 A1 | 7/2005 | Ikeda et al. | |
| 2005/0265684 A1 | 12/2005 | Nemoto et al. | |
| 2006/0165370 A1 | 7/2006 | Nemoto et al. | |
| 2007/0019249 A1 | 1/2007 | Osakabe et al. | |
| 2008/0198427 A1 | 8/2008 | Wang | |
| 2009/0015883 A1 | 1/2009 | Kim | |
| 2009/0015886 A1 | 1/2009 | Kim et al. | |
| 2009/0225377 A1* | 9/2009 | Yokota et al. | 358/498 |
| 2010/0014315 A1* | 1/2010 | Fujimoto | 362/615 |
| 2011/0102862 A1* | 5/2011 | Inoue et al. | 358/474 |

FOREIGN PATENT DOCUMENTS

| | | |
|---|---|---|
| GB | 1 394 572 | 5/1975 |
| JP | 02-226626 | 9/1990 |
| JP | 06-208066 | 7/1994 |
| JP | 2000-115470 | 4/2000 |
| JP | 2002-135533 | 5/2002 |
| JP | 2003-046735 | 2/2003 |
| JP | 2004-170858 | 6/2004 |
| JP | 2005-123675 | 5/2005 |
| JP | 2006-148956 | 6/2006 |
| KR | 10-2003-035966 | 5/2003 |
| KR | 10-2006-023571 | 3/2006 |
| KR | 10-2006-0054091 | 5/2006 |

OTHER PUBLICATIONS

Machine English language translation of JP 2004-170858, published Jun. 17, 2004.
English language abstract of KR 10-2003-35966, published May 9, 2003.
English language abstract of JP 2006-148956, published Jun. 8, 2006.
Machine English language translation of JP 2006-148956, published Jun. 8, 2006.
English language abstract of KR 10-2006-23571, published Mar. 14, 2006.
Office Action issued in U.S. Appl. No. 12/170,965, mailed Oct. 26, 2009.
Office Action issued in U.S. Appl. No. 12/170,935, mailed Oct. 5, 2009.
English language abstract of JP 02-226626, mailed Sep. 10, 1990.
European Search Report issued in European Application No. EP 08 16 0134.6, mailed Jun. 12, 2009.
English language abstract of JP 06-208066, published Jul. 26, 1994.
Machine English language translation of JP 06-208066, published Jul. 26, 1994.
English language abstract of JP 2003-046735, published Feb. 14, 2003.
Machine English language translation of JP 2003-046735, published Feb. 14, 2003.
European Search Report issued in Application No. 08153746.6 mailed Jul. 30, 2008.
English language abstract of JP 2002-135533, published May 10, 2002.
Machine English language translation of JP 2002-135533, published May 10, 2002.
Chinese Office Action issued Mar. 12, 2010 in CN Application No. 200810175673.5.
KR Office Action issued Sep. 22, 2011 in KR Patent Application No. 10-2007-0069502.

* cited by examiner

MULTI-FUNCTIONAL DEVICE HAVING SCANNER MODULE AND IMAGE SCANNING APPARATUS EMPLOYING THE SCANNER MODULE

CROSS-REFERENCE TO RELATED APPLICATION

This application claims priority under 35 U.S.C. §119(a) from Korean Patent Application No. 10-2007-0069502, filed on Jul. 11, 2007, in the Korean Intellectual Property Office, the disclosure of which is incorporated herein by reference in its entirety.

BACKGROUND OF INVENTION

The present disclosure relates generally to a scanner module and an image scanning apparatus employing the same and, more particularly, to a scanner module that is capable of uniformly distributing illumination over a predetermined area of a document, and an image scanning apparatus employing the same.

DESCRIPTION OF THE RELATED ART

An image scanning apparatus generally includes a scanner module. A scanner module includes a number of components. These components include, for example, a sensing unit, an illuminator, a reflecting mirror, and an imaging lens. The scanning is performed by the illuminator first illuminating the document to be scanned. The light source in an illuminator is generally a lamp. The lamp in newer scanners may be either a cold cathode fluorescent lamp (CCFL) or a xenon lamp, while older scanners may have a standard fluorescent lamp. Specifically, the illuminator bounces the light from the illuminator off the reflecting mirror on to the document to be scanned.

The image of the document is reflected by an angled mirror or by a series of mirrors. In some scanners, there may only be two mirrors while others may use greater number of mirrors. Each mirror is slightly curved to focus the image it reflects onto a smaller surface. The last mirror reflects the image onto a lens. The lens focuses the image through a filter onto the sensing unit.

A light source for a scanner module may beneficially have a number of features. For example, the light source should provide sufficient brightness in an area on the paper where the image is to be read. Furthermore, the light source should allow for an uniform distribution of illumination over the document to ensure that the image is scanned properly.

Various kinds of light sources have been developed to provide the light as part of the illuminator. For example, a high intensity white light emitting diode (LED) has been developed as a light source to be used in a scanner module.

The sensor unit used in the scanner module may be of different structures based on the type of image to be scanned. For example, a single-row structure may be used for scanning a black and white image but a plural row structure may be used for color image scanning.

FIG. 1 is a pictorial diagram illustrating a scanning module with a general color sensor unit for color image scanning. As illustrated therein, a sensor unit 7 includes color image sensors 7a provided in plural rows. These color image sensors 7a may be arranged according to the various colors being sensed. Furthermore, the rows of the color image sensor 7a are spaced apart from each other at a predetermined distance. An image from a predetermined scanning area A of a document 1 is focused on the sensor unit 7 by the imaging lens 5. For proper scanning, it may be beneficial that scanning area A on document 1 is illuminated uniformly.

The focus position of a scanner module is the position where light is reflected from the document being scanned on to the sensor unit. Ideally, it would be most beneficial that the focus position of the scanning module be the same for all scanners. That is, the focus position be one as designated in the design specification of the scanner module. However, due to defects introduced during the manufacturing process of scanners, there may be deviations in the focus positions of the actual scanner modules.

FIGS. 2 and 3 are schematic views illustrating deviations in the focus position of the scanner module. Referring to FIGS. 2 and 3, the solid line indicates the light path of an ideally assembled scanner module where components thereof are properly positioned. That is, the solid line indicates the intended light path. However, as shown in FIG. 2, e.g., the reflecting mirror 11 may be dislocated during the manufacture or during normal operation of the scanner module. Because of this dislocation, the focus position of the scanner module may deviate from the ideal position.

For example, if a reflecting mirror 11 is dislocated as illustrated in FIG. 2 or if a sensor unit 25 is dislocated as illustrated in FIG. 3, light may be incident via the abnormal light paths $L_2$ and $L_4$ instead of the ideal light paths $L_1$ and $L_3$. Furthermore, this light that is incident via the abnormal light paths $L_2$ and $L_4$ is focused on the sensor units 15 and 25.

In addition, or alternatively, the focusing position on the document 10 may be affected by operating conditions of the scanner module. For example, if the scanner module operates under high or low temperature environment characteristics, e.g., the position and/or the size of optical elements may be affected, resulting in a draft or deviation of the light path, which in turn may cause the focusing position on the document 1 to change.

Various known techniques may be used to attempt to minimize the effect of the variation in the focusing position of the scanner module. In one technique, the uniformity of illumination across the document 1 is maintained despite some deviation of the light path within a tolerable range.

For example, an image scanner employing a conventional LED as a light source has been disclosed in Japanese Patent Laid-open Publication No. 2004-170858 (published on 17 Jun. 2004). Referring to FIG. 4, the conventional image scanner includes first and second LEDs 35a and 35b mounted on a substrate 31. LEDs 35a and 35b are spaced apart from each other in the X-direction. Furthermore, first and second condensing lenses 37a and 37b are provided integrally with the first and second LEDs 35a and 35b, respectively. First and second condensing lenses 37a and 37b are used to condense light. The first and second condensing lenses 37a and 37b are arranged to make light emitted from the first and second LEDs 35a and 35b travel in a direction not parallel to the direction normal to the substrate 31. Furthermore, as shown in FIG. 4, the first and second condensing lenses 37a and 37b illuminate a predetermined position C of a document mount 39 on which the document is to be mounted.

FIG. 5 is a graph illustrating illumination distribution on a surface of a document in a case where the light source and the condensing lens are arranged as illustrated in FIG. 4. Referring to FIG. 5, the reference numeral I indicates the illumination distribution of light that is emitted from the first LED 35a and condensed by the first condensing lens 37a so as to illuminate the document placed on the document mount 39. Reference numeral II indicates the illumination distribution of light that is emitted from the second LED 35b and condensed by the second condensing lens 37b so as to illuminate the surface of the document. The reference numeral III indicates the summation of the distribution curves I and II.

Referring to I and II, the illumination distribution has the maximum value at a center position C. Center position C is equidistant from the light sources 35a and 35b in the X-direction. Therefore, according to the curve III obtained by summing the two illumination distributions, the illumination distribution on the document 1 has generally a Gaussian distribution with respect to the center position C.

While the above-discussed image scanner may be used to scan images, it suffers from various shortcomings. For example, as shown above, the illumination in the above-discussed image scanner is the most at the center position C of the document rather than being distributed uniformly over a larger area of the document. This may affect the quality of the scanned image because generally, a larger area than point C of a document needs to be scanned. The disclosed scanner module is configured to overcome one or more limitations of the above-discussed image scanner.

SUMMARY OF THE INVENTION

One aspect of the disclosure includes a multi-functional device having scanner module for scanning images. The multi-functional device having scanner module comprises an illuminator configured to illuminate a document by emitting light onto the document. The illuminator comprises a light source configured to emit the light and a light guide unit configured to guide the light emitted from the light source to illuminate at least two areas on the document, center positions of the at least two areas on the document being spaced apart from each other.

Another aspect of the present disclosure comprises an image scanning apparatus. The apparatus comprises a multi-functional device having scanner module. The multi-functional device having scanner module comprises an illuminator configured to illuminate light onto a document. The illuminator comprises a light source configured to emit the light and a light guide unit configured to guide light emitted from the light source to illuminate at least two areas on the document, center positions of the at least two areas on the document mount being spaced apart from each other. The apparatus also comprises an image processor configured to process an image obtained by the multi-functional device having scanner module.

BRIEF DESCRIPTION OF THE DRAWINGS

These and other features of the present disclosure will become apparent and more readily appreciated from the following description of the exemplary embodiments, taken in conjunction with the accompanying drawings, in which.

DETAILED DESCRIPTION OF SEVERAL EMBODIMENTS

Figure 1:
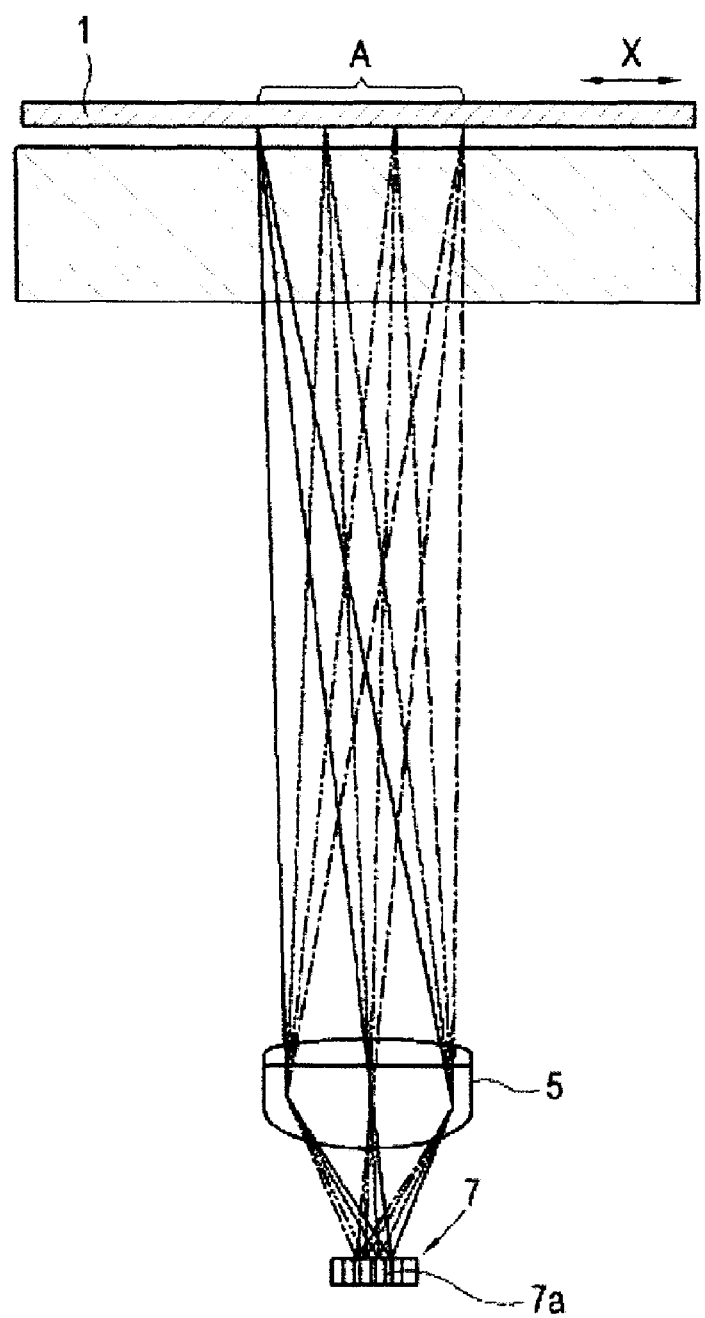
FIG. 1 is a schematic view illustrating a scanner module including a color sensor unit for sensing a color image.
Figure 2:
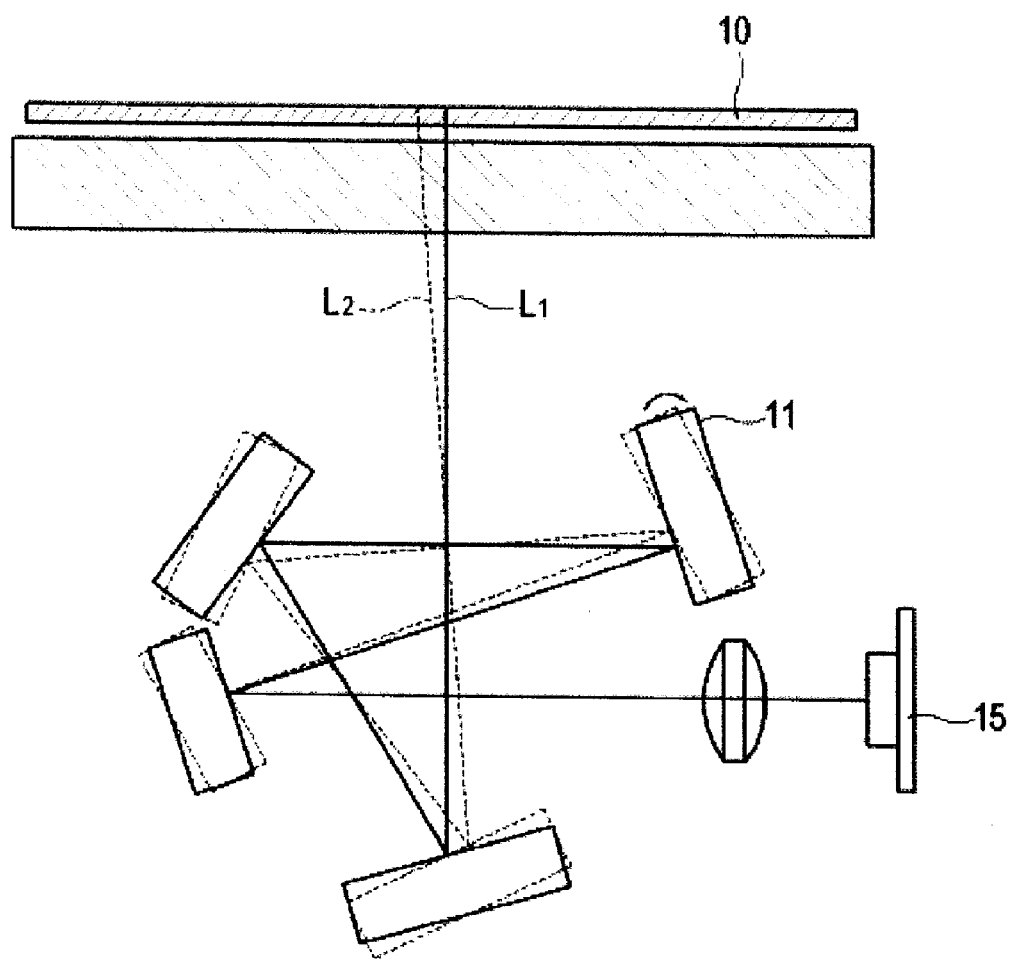
FIG. 2 is a schematic view explaining a change in a focusing position due to changes in a position and an angle of a mirror in the scanner module.

Reference will now be made in detail to exemplary embodiments of the present disclosure, examples of which are illustrated in the accompanying drawings, wherein like reference numerals refer to like elements throughout.

Figure 6:
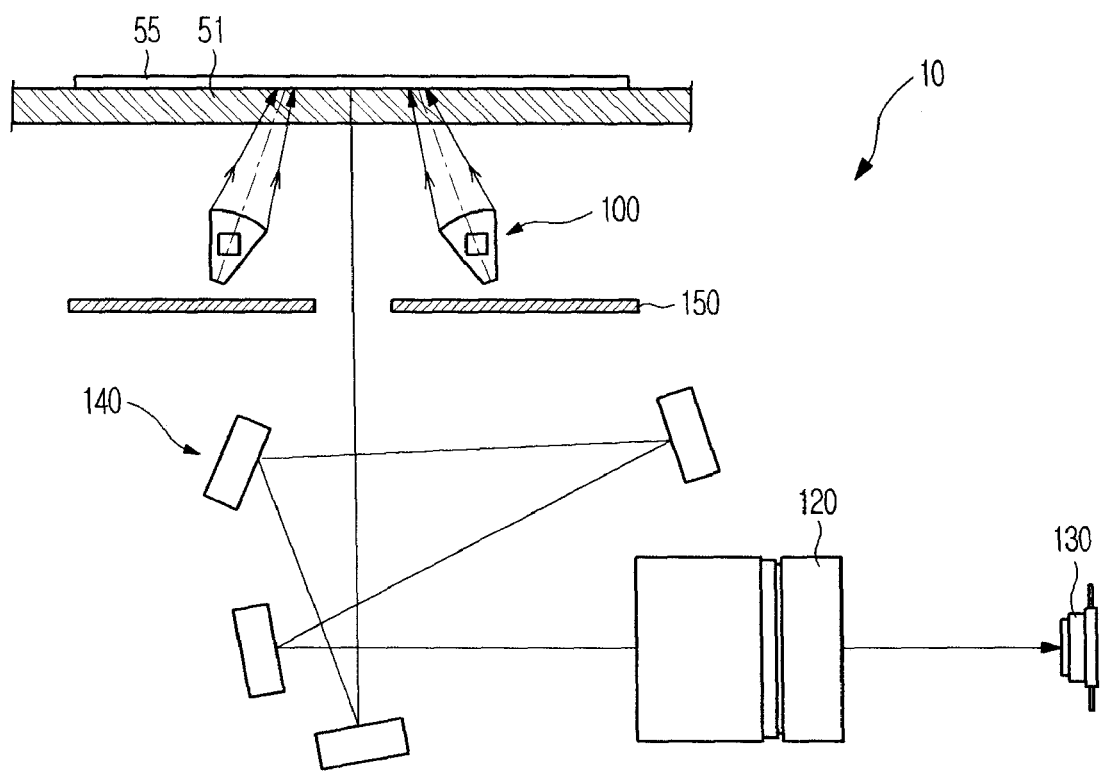
FIG. 6 is a schematic view showing a scanner module employed in an image scanning apparatus according to an embodiment of the present invention.

FIG. 6 is a schematic view illustrating an optical arrangement of a scanner module 10 according to an embodiment. Referring to FIG. 6, a scanner module 10 according to this embodiment may include an illumination device 100 that irradiates light onto an object 55 placed on the manuscript board 51, an image sensor 130, which receives the light reflected from the object 55, and which converts the light into electric signals, a plurality of reflection mirrors 140, which direct the light reflected from the object 55 toward the image sensor 130, and a focus lens 120 arranged in front of the image sensor 130 in the optical path such that the light can be focused on the image sensor 130.

Among the above elements of the scanner module 10, the image sensor 130 reads image information of the object 55 based on the light that is focused on the image sensor 130 through the focus lens 120. The image sensor 130 can provided with various arrangement of sensing elements according to the desired image scanning application. For example, the image sensor 130 may be arranged in a single row or in a plurality of rows of sensor elements for color image scanning of red/green/blue or red/green/blue/white-black.

According to an embodiment, a plurality of reflecting mirrors 140 may be provided between the object 55 and the focus lens 120. The plurality of reflecting mirrors 140 reflect light from the object 55, to change the direction in which the light travels, thereby allowing a predetermined optical path in a limited space. While, for illustrative purposes, four reflecting mirrors 140 are shown in FIG. 6, one skilled in the art will appreciate that the number of reflecting mirrors 140 can be varied without departing from the scope of the disclosure.

The scanner module 10 may further include a light aperture or window 150 to regulate the light traveling toward the image sensor 130. To this end, the light window 150 is disposed between the illumination device 100 and the reflection mirrors 140 to prevent undesired light from reaching the image sensor 130.

Figure 7:
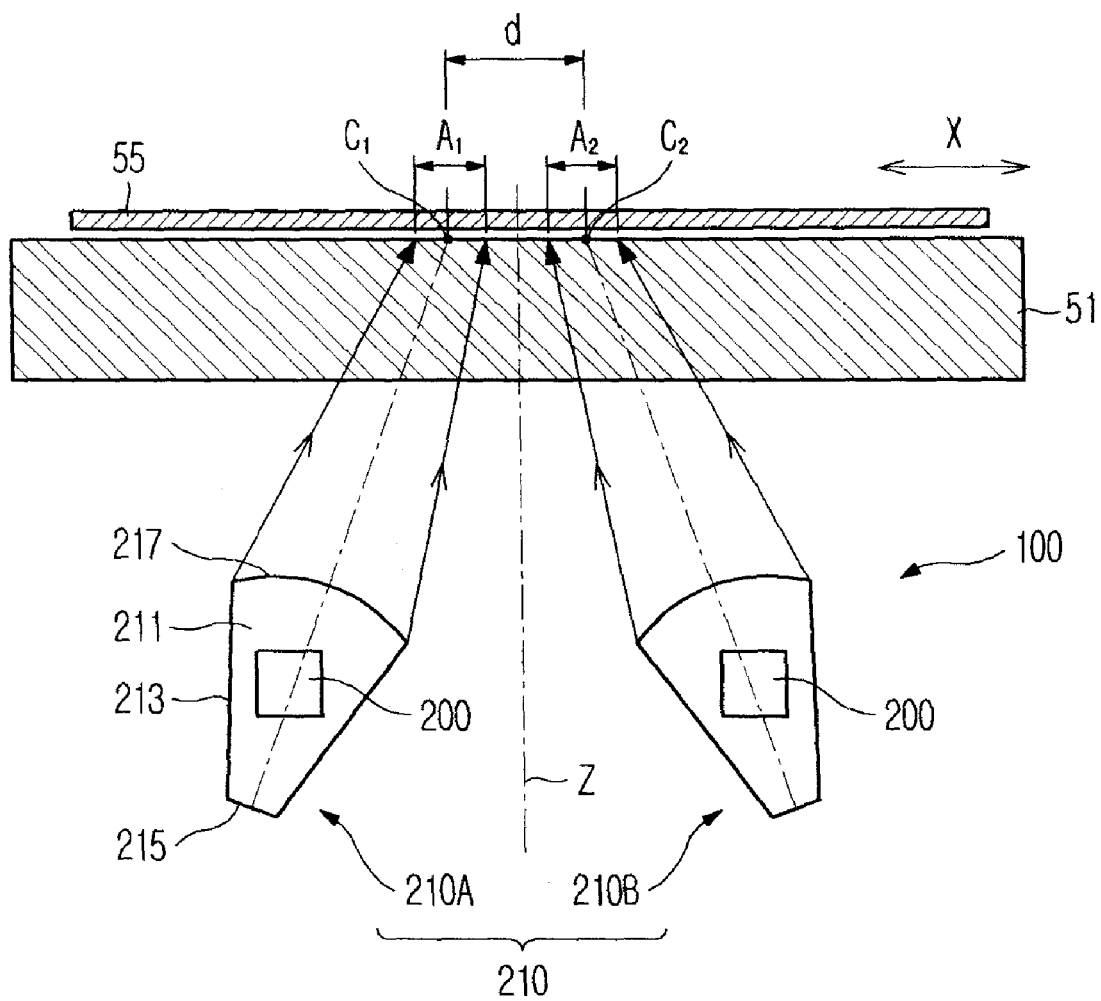
FIG. 7 is a schematic view showing an illumination device employed in an image scanning apparatus according to an embodiment of the present invention.
Figure 8:
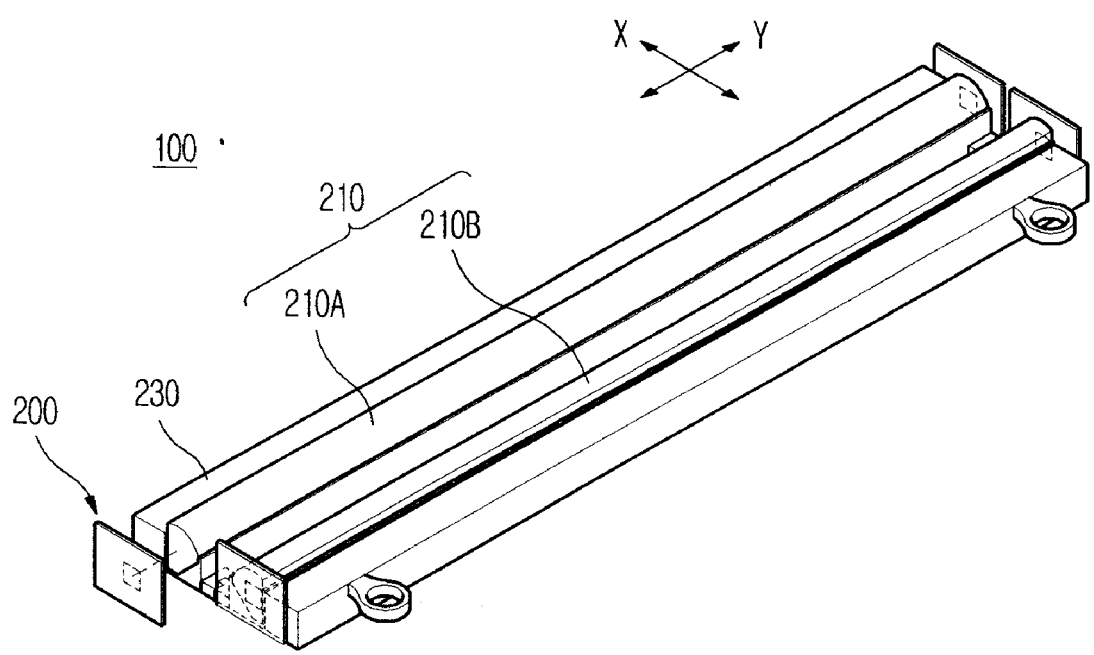
FIG. 8 is a perspective view showing an illumination device employed in an image scanning apparatus according to an embodiment of the present invention.

FIG. 7 is a schematic view illustrating an optical arrangement of an illuminator of a scanner module according to an embodiment, and FIG. 8 is a perspective view of the illuminator of FIG. 7.

Figure 5:
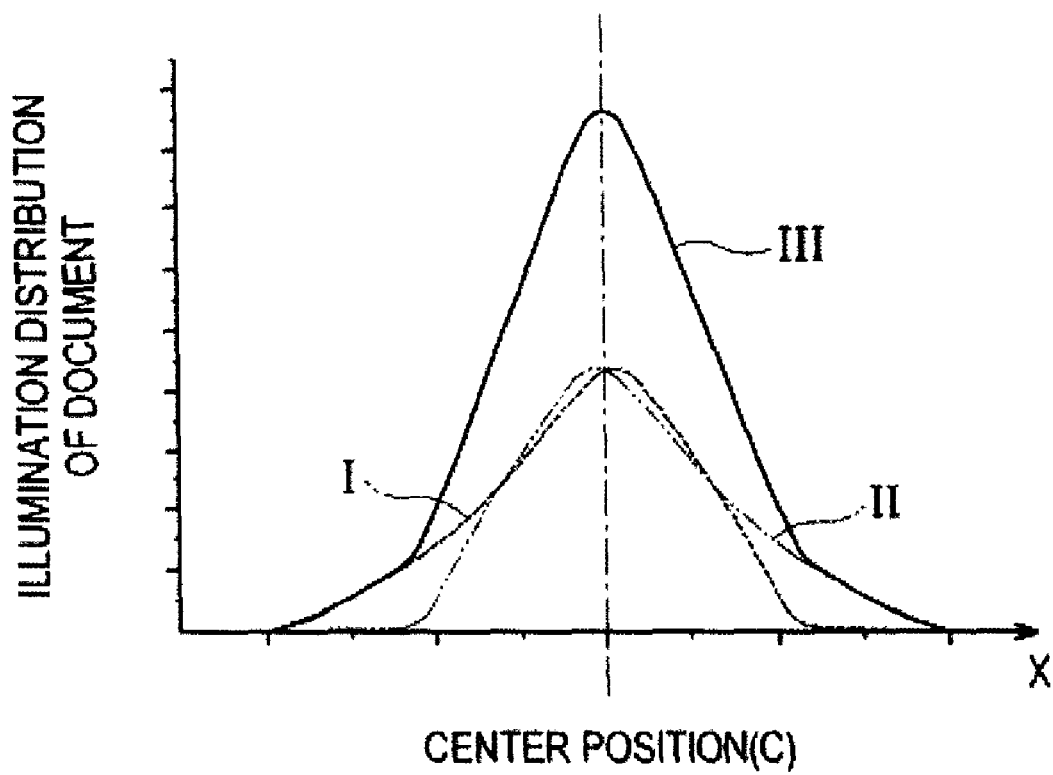
FIG. 5 is a graph illustrating illumination distribution on a document in the illuminator of FIG. 4.
Figure 10:
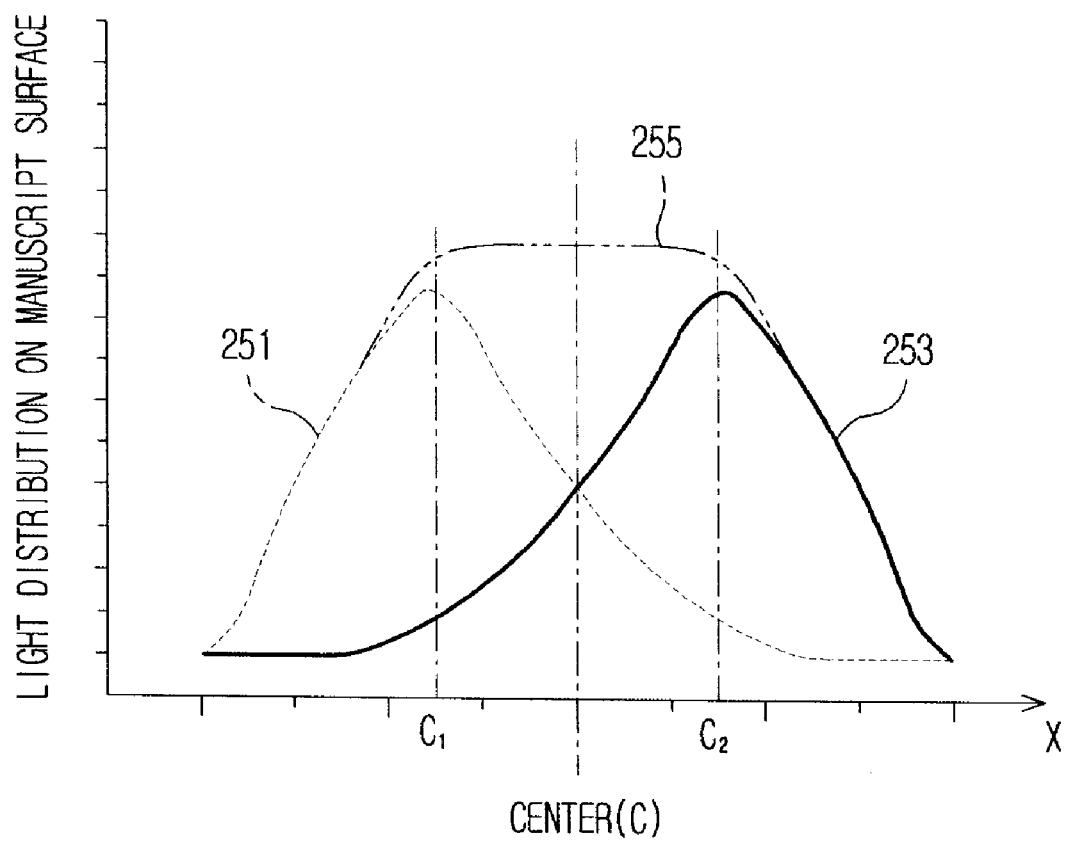
FIG. 10 is a graph showing light distribution on the surface of a manuscript in the width direction of the light guide member employed in an image scanning apparatus according to an embodiment of the present invention.

Referring to FIGS. 5 and 6, the illuminator 100 illuminates the document or manuscript board 51 by sending light along a main-scanning direction (see the Y-direction in FIG. 10). This main-scanning direction is substantially perpendicular to an image scanning direction (X-direction) of the scanner module. The illuminator may include a light source 200 emitting light, and a light guide unit 210 extending lengthwise in the main-scanning direction Y and facing the manuscript board 51.

The light guide unit 210 guides the light toward the object 55 by diffusing the light from the light source 200. The light guide unit 210 includes a pair of light guide members 210A and 210B facing the manuscript board 51, and each extend longitudinally along the main-scan direction (Y-direction as shown in FIG. 8) defining the lengths of the light guide units while along the image scan direction (X-direction) the widths of the light guide units 210 are defined.

According to an embodiment, the light source 200 may include light emitting diodes capable of emitting light having a wavelength band of three primary colors, namely, red, green and blue. The light emitting diodes may be semiconductor devices, an may be capable of generating a sufficient amount of light within a relatively short period of time in comparison to a CCFL or the xenon lamp. Thus, the start-up time of the scanner module 10 can be shortened and power consumption can be reduced. For example, when a light emitting diode is used as the light source according to an embodiment of the present invention, since the light emitting diode, which is a semiconductor device, may achieve the peak amount of light output within in a short period of time, e.g., 1 μs, the start-up time of the light source may be shorter in comparison with that a light source utilizing a CCFL which may require the start-up time in excess of, e.g., 30 seconds.

Moreover, a light emitting diode may also be advantageous as a light source over a CCFL as unlike a CCFL that is driven at high voltage, e.g., at several hundreds to thousands of voltages, the semiconductor light source can be driven at a low voltage, obviating the need for the use of inverters used for voltage boosting and AC generation. Thus, the manufacturing cost can be reduced and space utilization can be improved. Also, since the inverters can be omitted, power consumption can be reduced.

Further, while in the case of a CCFL, the amount of light may be reduced at low temperature, the semiconductor light source according to an embodiment of the present invention may be capable of relatively stable light output over wider temperature range. In addition, a semiconductor light source may also reduce the amount of the electromagnetic waves, which may be a source of noise for internal circuits. Further, the semiconductor light source of an embodiment of the present invention may be more durable as compared with the CCFL which is made from thin glass material.

Furthermore, the light emitting diodes may have longer operating life, e.g. of about hundred thousand hours, as compared to a CCFL. In addition, the light emitting diodes can be fabricated without mercury (Hg) that may present environmental concern.

Although, in the embodiment described above, light emitting diodes capable of emitting light having a wavelength band of three primary colors are used as the light source 200, the scope of the application of the present invention is not so limited. For instance, a white light emitting diode coated with fluorescent material to generate blue color or an ultraviolet ray to generate a white color, can also be used as the light source 200. Further, various types of point light sources other than a light emitting diode can alternatively be used as the light source 200.

The light guide members 210A and 210B convert the optical path of light irradiated from the light source 200 such that the light can be irradiated onto at least two regions $A_1$ and $A_2$. The light guide members 210A and 210B are spaced apart from each other in the image scan direction. For the purpose of convenience, the light guide member 210A provided on one side of the image scan direction will be referred to as the first light guide member and the light guide member 210B provided on the other side of the image scan direction will be referred to as the second light guide member. The centers $C_1$ and $C_2$ of the two regions Al and $A_2$ are spaced apart from each other in the image scan direction X by a distance d. Therefore, the light can be illuminated onto the center C of the object 55 placed on the manuscript board 51 as well as a predetermine region of the object 55 which deviates from the center C of the object 55.

According to the embodiment shown in FIGS. 5 and 6, the illumination device 100 can illuminate the light onto the first and second regions $A_1$ and $A_2$ and a pair of light guide members 210A and 210B are provided to guide the light onto the first and second regions $A_1$ and $A_2$. In addition, the illumination device 100 may further include a holder 230 for guiding the installation position of the light guide members 210A and 210B when the light guide members 210A and 210B are installed in the optical path.

The light guide members 210A and 210B may have elongated shapes extending in the main-scan direction Y, and may include transparent materials, such as, e.g., PMMA (polymethyl methacrylate). Each of the light guide members 210A and 210B may have an incident surface 211, a guide surface 213, a reflective surface 215 and an exit surface 217.

The light from the light source 200 is incident onto the incident surface 211. The incident surface 211 is formed on at least one longitudinal end portion of the light guide members 210A and 210B and the light source 200 faces the incident surface 211.

Figure 9:
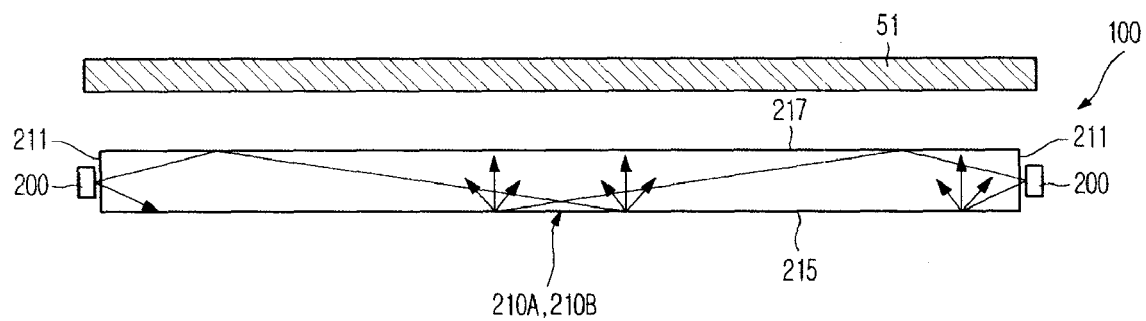
FIG. 9 is a sectional view of the illumination shown in FIG. 8.

For example, FIG. 9 shows incident surfaces 211 that are formed on both longitudinal end portions of the light guide members 210A and 210B. Also according to the embodiment shown in FIG. 9, the light sources 200 are provided to correspond to the incident surfaces 211 formed on both longitudinal end portions of the light guide members 210A and 210B to irradiate light to the incident surfaces 211, thereby increasing the amount of light in the illuminator 100.

The light guide members 210A and 210B, when installed in the holder 230, are slantingly arranged such that the light reflected from the object 55 does not interfere with the light guide members 210A and 210B. That is, as shown in FIG. 7, the central line of light that is output from the light guide members 210A and 210B is inclined relative to a central optical axis Z of the light.

FIG. 10 is a graph showing light distribution on a surface of a document to be scanned in the width direction of the light guide members 210A and 210B when the light source and the light guide members 210A and 210B are arranged as shown in FIG. 7.

Referring to FIG. 10, reference numeral 251 represents a light distribution curve on the surface of the manuscript placed on the manuscript board 51 when the light is output from the first light guide member 210A, and reference numeral 253 represents a curve showing light distribution on the manuscript board 51 when the light is output from the second light guide member 210B. In addition, reference numeral 255 represents a curve showing the total light distribution on the manuscript board 51.

Referring again to FIG. 7, when the light sources 200 and the light guide members 210A and 210B are arranged as shown, the amount of light irradiated onto the manuscript board 51 is maximized at the center $C_1$ of the first region $A_1$ and at the center $C_2$ of the second region $A_2$. As previously mentioned, the center $C_1$ of the first region $A_1$ is spaced apart from the center $C_2$ of the second region $A_2$ by the distance d. Referring to the curve 255 that is the sum of the curves 251 and 253, the amount of light irradiated onto the first and second regions $A_1$ and $A_2$ is substantially constant in the region between the center $C_1$ of the first region $A_1$ and the center $C_2$ of the second region $A_2$.

The illumination device 100 having the above structure can illuminate light over a relatively large region of the manuscript as compared with the conventional illumination device. Thus, the illumination device 100 can be employed in the scanner module 10 capable of performing color scanning operation, and the optical elements constituting the scanner module 10 may have a relatively large assembling tolerance, so that productivity of the scanner module 10 can be improved.

The scanner module 10 according to an embodiment employs the illumination device 100 capable of illuminating light over the relatively large region of the manuscript, so that the output value of the image sensor 130 may remain uniform despite possible deviations in positioning of the reflection mirrors 140 and the focus lens 120 during assembly of the illumination device 100.

The exit surface 217 faces the manuscript board 51. The light that is diffused and reflected by the reflective surface 215 and the guide surface 213 may be output through the exit surface 217. The exit surface 217 may function as a condenser lens that focuses the light on the manuscript board 51, so that light illuminated in the first region $A_1$ may have a Gaussian distribution. According to the present embodiment, as shown in FIG. 7, the exit surface 217 is provided as a convex lens having an arc-shape section with a predetermined curvature.

The reflective surface 215 is disposed in opposition to the exit surface 217 so as to diffuse and reflect the light incident through the incident surface 211, thereby allowing the light to be uniformly output through the entire surface of the exit surface 217. To this end, the light is preferably subject to scattered reflection over the entire area of the reflective surface 215.

Figure 11:
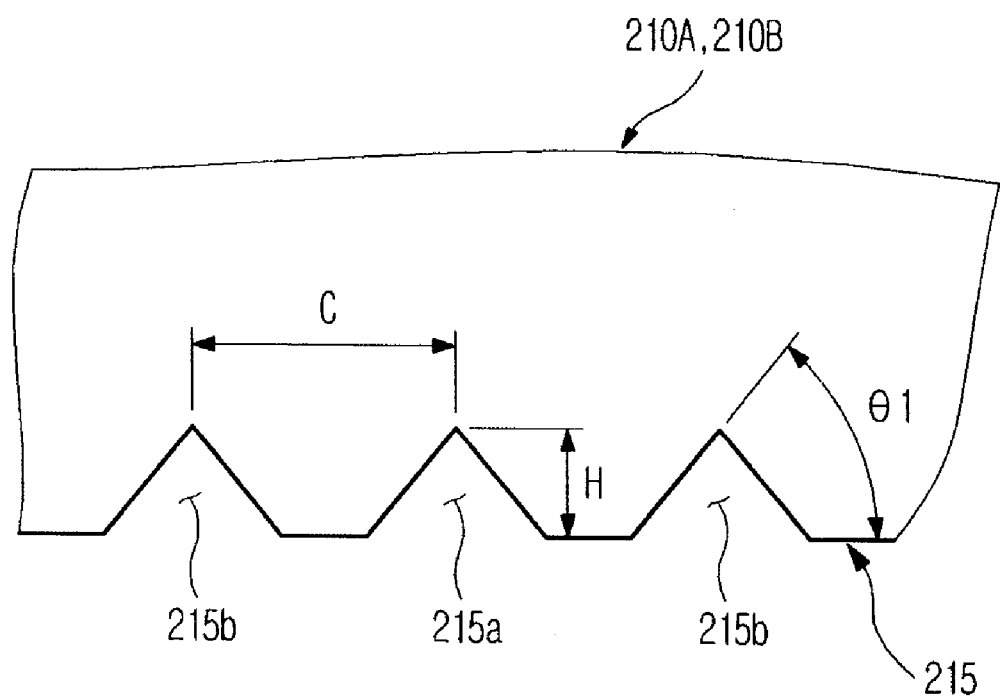
FIG. 11 is a sectional view of a reflective surface of a light guide member employed in an image scanning apparatus according to an embodiment of the present invention.

According to an embodiment, and as shown in FIG. 11, the reflective surface 215 may be formed with a plurality of reflective grooves 215a and 215b so that the light from the light source 200 is subject to a scattered reflection. According to an embodiment, the reflective grooves 215a and 215b may have triangular sectional shapes to guide the light received from the light source 200 through the incident surface 211 at longitudinal end portions of the light guide members 210A and 210B toward the exit surface 217 of the light guide members 210A and 210B. The amount of light reflected toward the exit surface 217 of the light guide members 210A and 210B by the reflective grooves 215a and 215b may increase proportionally to the height H of the triangular section of the reflective grooves 215a and 215b and to the inclination angle $\theta 1$ of the lateral side of the triangular section. Therefore, the amount of light irradiated from the light guide members 210A and 210B can be adjusted by properly adjusting the height H and the inclination angle $\theta 1$ of the triangular section of the reflective grooves 215a and 215b.

Although the above embodiment has been described to be provided with the reflective grooves 215a and 215b formed in the reflective surface 215 having the triangular cross-section, the present invention is not so limited. For instance, the reflective grooves 215a and 215b may also have arc-shaped sections or rectangular-shaped sections.

Figure 12:
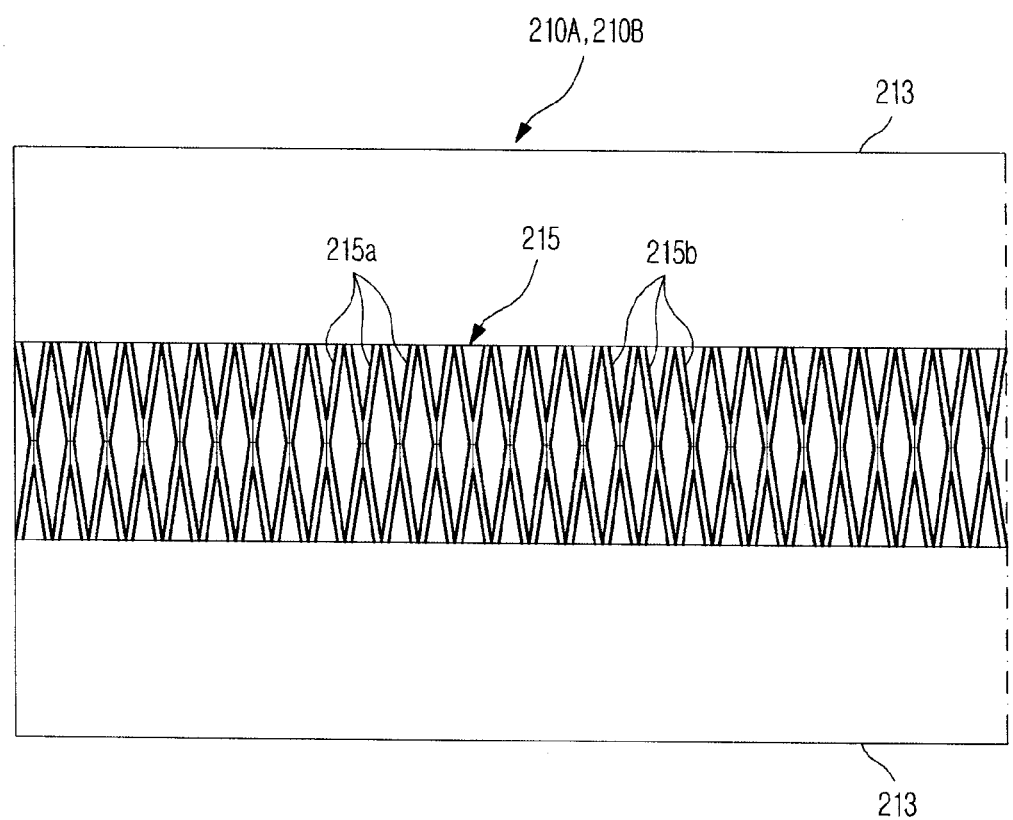
FIG. 12 is a schematic plan view of a reflective surface of a light guide member employed in an image scanning apparatus according to an embodiment of the present invention.

As shown in FIG. 12, the reflective surface 215 of the light guide members 210A and 210B according to an embodiment may be formed with first and second reflective grooves 215a and 215b, which are symmetrically formed while being inclined along the widths of light guide members 210A and 210B. According to the an embodiment, the first and second reflective grooves 215a and 215b may cross each other on the reflective surface 215.

With the above configuration, the light irradiated from the light source 200 can be guided toward the exit surface 217 of the light guide members 210A and 210B while being diffused in the lateral direction by the first and second reflective grooves 215a and 215b, so that the light can be uniformly distributed in the width direction of the light guide members 210A and 210B when the light is received through the incident surfaces 211 at longitudinal end portions of the light guide members 210A and 210B. As can be understood from the above, the amount of light diffused in the width direction of the light guide members 210A and 210B may increase proportionally to the inclination angle of the first and second reflective grooves 215a and 215b.

Figure 13:
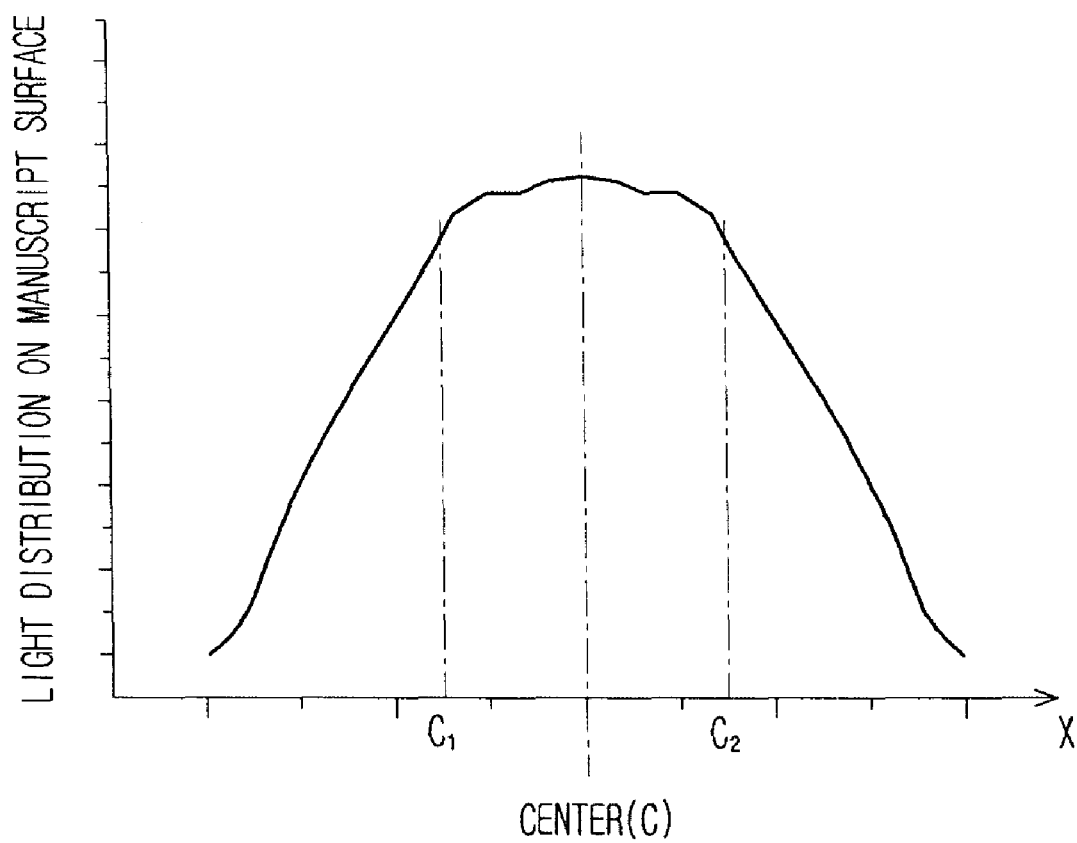
FIG. 13 is a graph showing light distribution on the surface of a manuscript in the width direction of the light guide member employed in an image scanning apparatus according to an embodiment of the present invention.

FIG. 13 is a graph of light distribution curve on across the width of a manuscript board 51 when the light is illuminated with the light guide members 210A and 210B having the first and second reflective grooves 215a and 215b, which are symmetrically patterned while being non-parallel with respect to each other, and when the light irradiated from the longitudinal end portions of the light guide members 210A and 210B is emitted through the exit surface 217.

Figure 3:
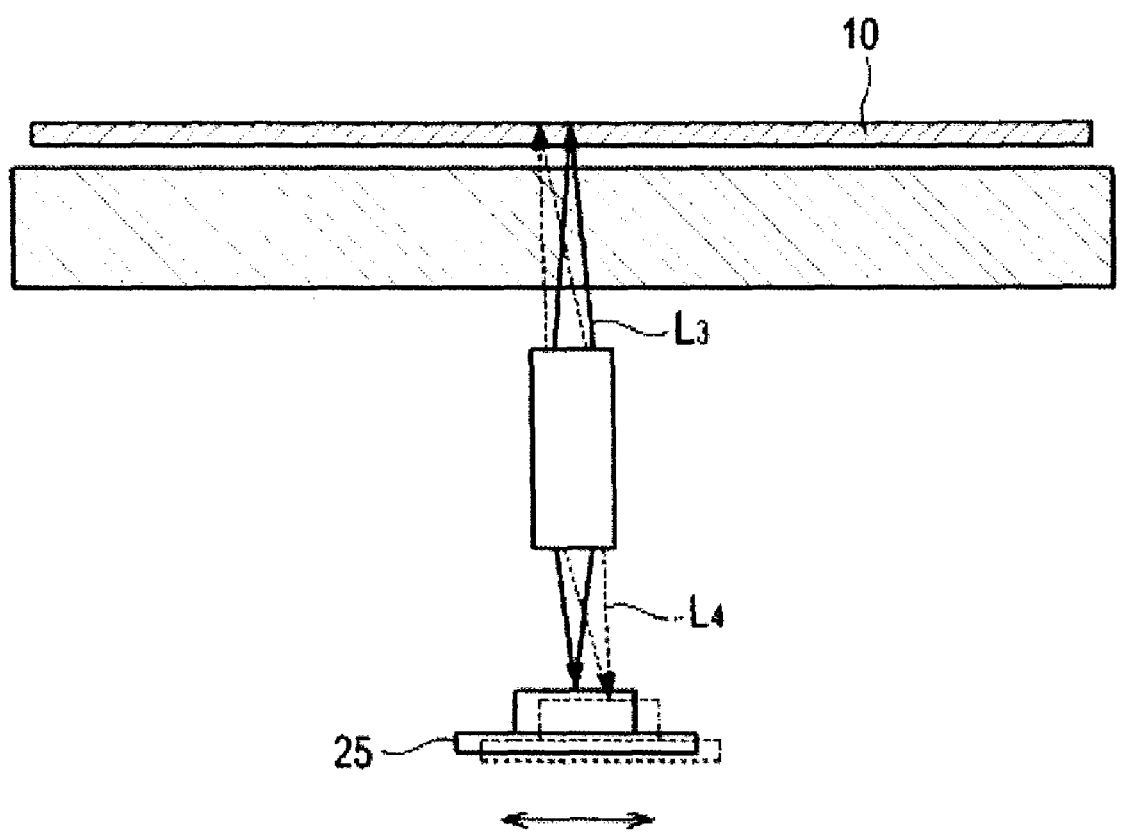
FIG. 3 is a schematic view explaining a change in a focusing position due to a change in a position of an image sensor in the scanner module.
Figure 4:
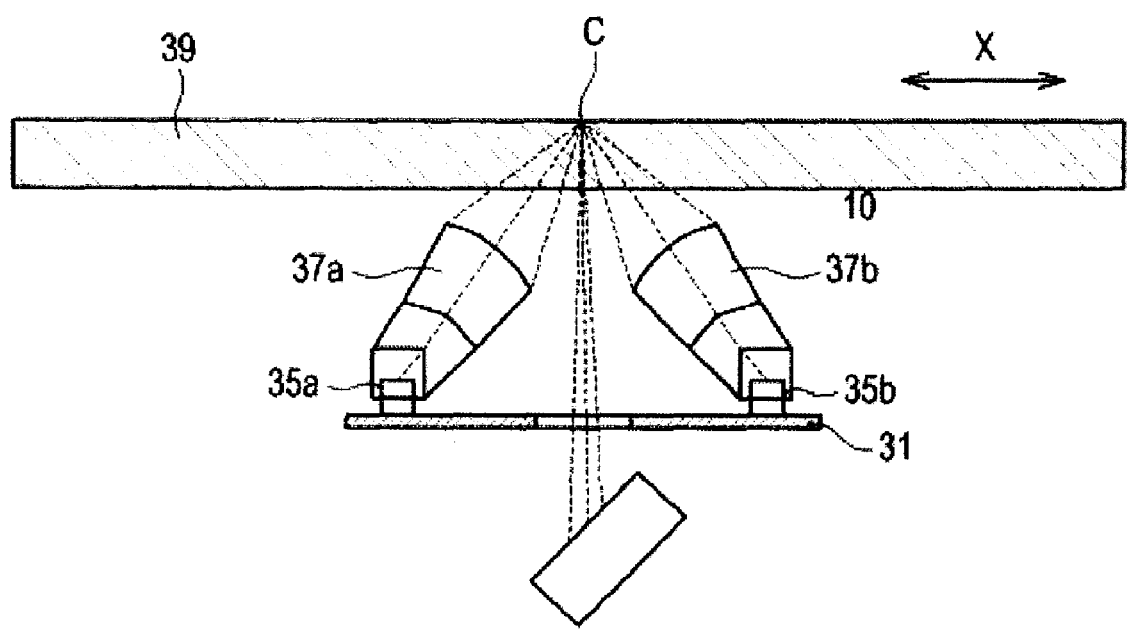
FIG. 4 is a schematic view of an illuminator including a conventional light emitting diode (LED) as a light source and used in a scanning apparatus.

Comparing the light distributions illustrated in FIG. 13 with the distribution of FIG. 3, the light guide member 210A or 210B having the first and second reflective grooves 215a and 215b, which extend non-parallel with respect to each other and in relation to the width of the reflective surface 215, and which can effectively diffuse or scatter the light in the width direction of the light guide member 210A and 210B, results in a more uniform light distribution across the manuscript board 51 than the conventional light guide member 1 shown in FIG. 1 having a plurality of reflective grooves 1d, which are formed parallel to each other.

Although the above embodiment has been described as an illustrative example with the reflective surface 215 formed with plural reflective grooves 215a and 215b to allow the light to be subject to scattered reflections, the present invention is not so limited. For instance, the reflective surface 215 may be provided with a micro-lens shape or a cylindrical shape. When the reflective surface 215 has the above configuration, the reflective surface 215 can scatter the incident light, so that the light can be uniformly output through the exit surface 217. In an embodiment, a light diffusion material, such as a white pigment, can be coated on the reflective surface 215 such that light can be uniformly irradiated from the exit surface 217.

Referring again to FIG. 7, the guide surface 213 is formed on both sides of the light guide members 210A and 210b in order to guide the incident light, which is incident into the incident surface 211, such that the incident light can be irradiated through substantially the entire area of the exit surface 217 by internal total reflection.

Figure 14:
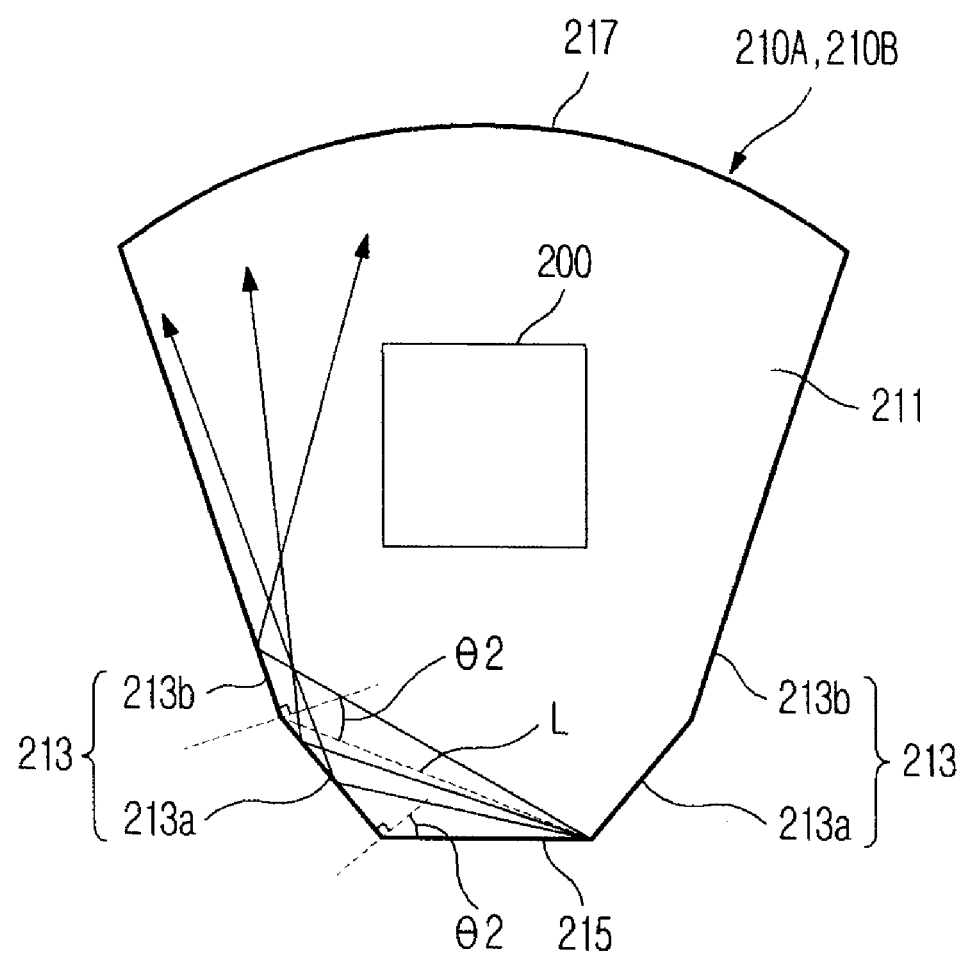
FIG. 14 is a sectional view showing a light guide member according to an embodiment of the present invention.

As shown in FIG. 14, a plurality of guide surfaces 213 are symmetrically formed at both sides of the light guide members 210A and 210b to reflect the light, which is reflected from the reflective surface 215 at various reflection angles, toward the exit surface of the light guide members 210A and 210b. If the plural guide surfaces 213 are symmetrically formed on both sides of the light guide members 210A and 210b, most of the light reflected from the reflective surface 215 may be guided toward the exit surface 217 of the light guide members 210A and 210b while being reflected by the guide surfaces 213, so that the amount of light leaked out of the light guide members 210A and 210b through the guide surfaces 213 can be reduced. As the light reflected from the reflective surface 215 is reflected again by the guide surfaces 213, the guide surfaces 213 may serve as a virtual light source together with the reflective surface 215. Therefore, the light distribution on the surface of the manuscript can be adjusted by properly adjusting the angle of guide surfaces 213 when the light is irradiated through the exit surface 217 of the light guide members 210A and 210b.

According to an embodiment of the present invention, the guide surfaces 213 may include a first guide surface 213a, which extends from both sides of the reflective surface 215 while forming an obtuse angle relative to the reflective surface 215, and a second guide surface 213b, which extends from the first guide surface 213a while forming an obtuse angle relative to the first guide surface 213a.

If the first and second guide surfaces 213a and 213b are formed on both sides of the light guide members 210A and 210b, the light reflected from the reflective surface 215 at a relatively large reflection angle can be reflected toward the exit surface 217 of the light guide members 210A and 210b by the first guide surface 213a, and the light reflected from the reflective surface 215 at a relatively small reflection angle can be reflected toward the exit surface 217 of the light guide members 210A and 210b by the second guide surface 213b, so that the amount of light leaked out of the light guide members 210A and 210b can be reduced.

In order to minimize the light loss, the incident angle of the light incident onto the first and second guide surfaces 213a and 213b from the reflective surface 215 is desirably greater than a critical incident angle $\theta 2$ that ensures total reflection of the light.

In accordance with an embodiment, preferably, the angle between the reflective surface 215 and the first guide surface 213a is equal to or greater than the sum of the critical incident angle $\theta 2$ that ensures total reflection of the light and an angle of 90°. In addition, the angle between the first guide surface 213a and the second guide surface 213b may also be designed such that the incident angle of the light, which is incident onto the second guide surface 213b from the reflective surface 215, may be equal to or greater than the critical incident angle $\theta 2$. Since the minimum incident angle of the light incident on the second guide surface 213b may correspond to an angle between a virtual line L (shown in FIG. 14) and the second guide surface 213b of one side of the light guide member 210A or 210B where the virtual line L extends from the edge serving as the boundary between the reflective surface 215 and the first guide surface 213a on the other side of the light guide member 210A or 210B to an edge serving as a boundary between the first guide surface 213a and the second guide surface 213b of the same side of the light guide member 210A or 210B, the angle between the virtual line L and the second guide surface 213b may preferably be equal to or greater than the sum of the critical incident angle $\theta 2$ and an angle of 90°.

As described above, according to an embodiment, the light guide members 210A and 210B may be formed with polymethyl methacrylate, the critical incident angle $\theta 2$ of which may be 41.8°. Therefore, the angle between the reflective surface 215 and the first guide surface 213a and the angle between the virtual line L and the second guide surface 213b mat be made to be equal to or greater than 131.8°.

According to an embodiment of the present invention, although the angle between the reflective surface 215 and the first guide surface 213a, and the angle between the virtual line L and the second guide surface 213b, are both described as being equal to or greater than $\theta 2$ plus 90°, since the light may be subject to Lambertian reflection at the reflective surface 215, the amount of light incident on the first guide surface 213a may be relatively small. Thus, according to another embodiment, the scattering reflection and the uniform light distribution may be achieved by setting only the angle between the virtual line L and the second guide surface 213b greater than the sum of the critical incident angle $\theta 2$ and an angle of 90°.

According to an embodiment, the light guide members 210A and 210B may be formed with material other than polymethyl methacrylate. For instance, the light guide members 210A and 210B may alternatively formed with colorless transparent resin. The critical incident angle according to the type of resins can be calculated using Snell's law.

Figure 15:
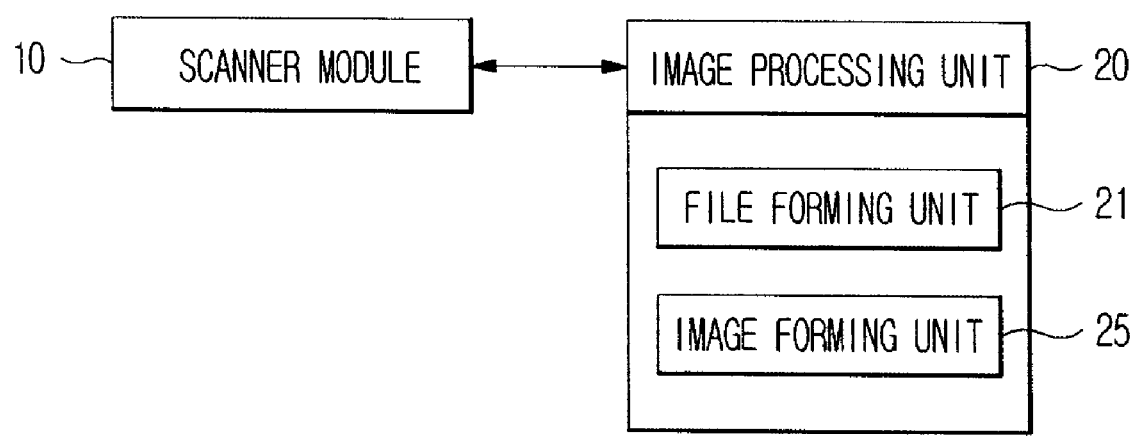
FIG. 15 is a block diagram of an image scanning apparatus according to an embodiment of the present invention.

FIG. 15 is a block diagram of the image scanning apparatus according an embodiment of the present invention. Referring to FIG. 15, the image scanning apparatus according to this embodiment may include the scanner module 10e and an image processing unit 20 which processes the image obtained from the scanner module 10. The image scanning apparatus of the present invention may include an MFP (multi-function printer), a copy machine, a facsimile machine, a scanner, or the like.

As various scanner module 10 has already been and will further be described herein. The image processing unit 20 may include at least one of a file forming unit 21 for forming an image file based on the image obtained from the image sensor of the scanner module 10 and an image forming unit 25 for forming an image on a printing medium based on the image obtained from the image sensor. The file forming unit 21 may be a microprocessor, microcontroller or the like, that includes a CPU to execute one or more computer instructions to implement the operation of forming the image files from the image data received from the image sensor of the scanner module 10, and may further include a memory device, e.g., a Random Access Memory (RAM), Read-Only-Memory (ROM), a flesh memory, or the like, to store the one or more computer instructions. The image forming unit may include any of various printing mechanisms, e.g., one utilizing electro-photographic image forming technique, which may include photosensitive member to which latent images are formed, and the latent image of which is developed into a toner image that is transferred and fixed on a printing medium, e.g., a sheet of paper, one that utilizes ink jet technique including an ink jet print head that places tiny ink droplets through nozzles of the print head directly on the paper, or the like.

Accordingly, if the image scanning apparatus employs the scanner module 10 having the illumination device 100 described above, the image sensors aligned in a plurality of rows can output uniform values even if the position of optical elements, such as reflection mirrors, becomes out of alignment by various external parameters.

Although some of the embodiments, such as sown in FIG. 8, are described to include the separate light guide members 210A and 210B that are installed together through the holder 230, the present invention is not so limited. For instance, according to an alternative embodiment, e.g., as shown in FIG. 16, a pair of light guide members 310A and 310B may be extruded as an integral body, e.g., by using a single mold.

Figure 16:
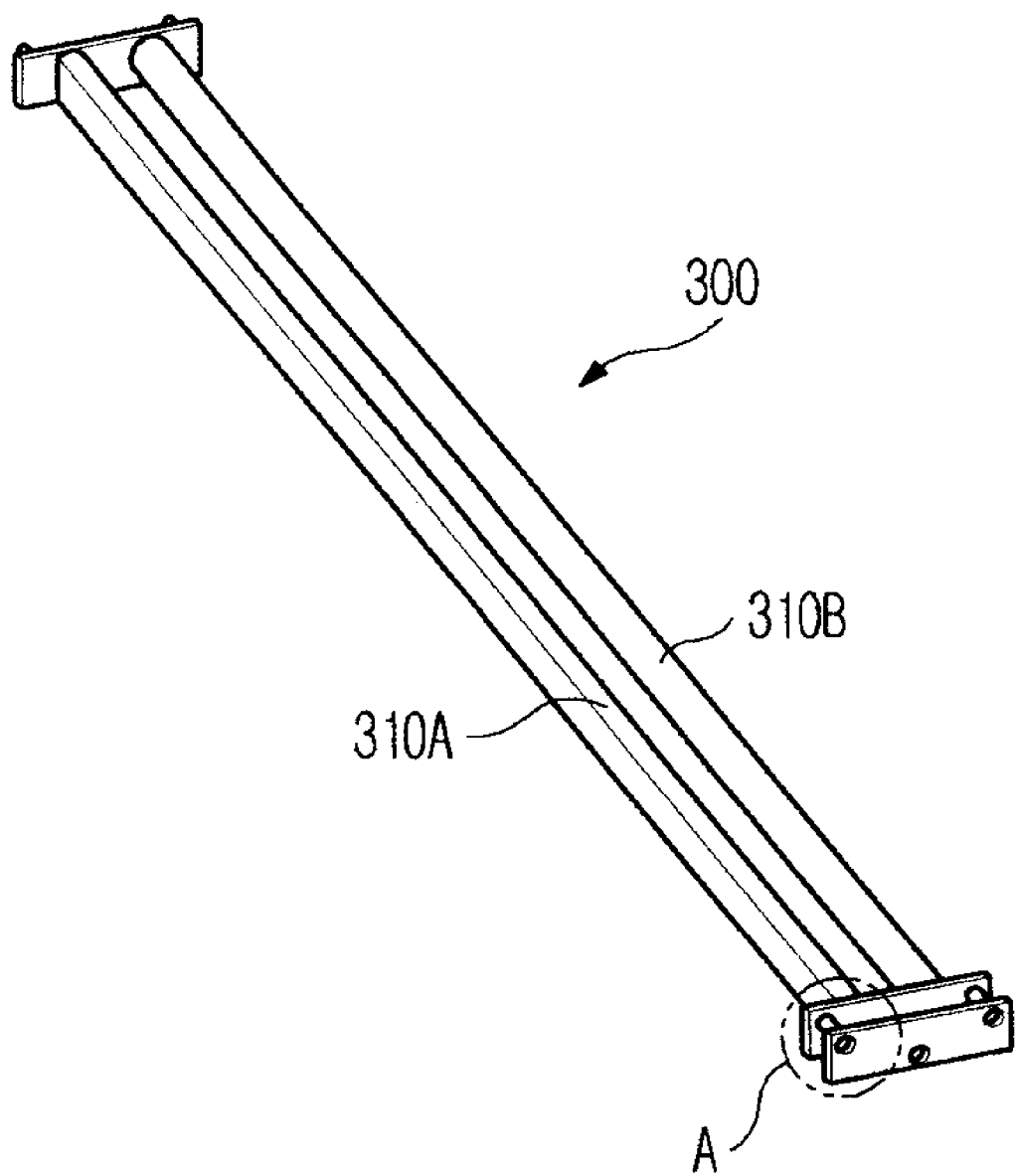
FIG. 16 is a perspective view showing an illumination device employed in an image scanning apparatus according to an embodiment of the present invention.
Figure 17:
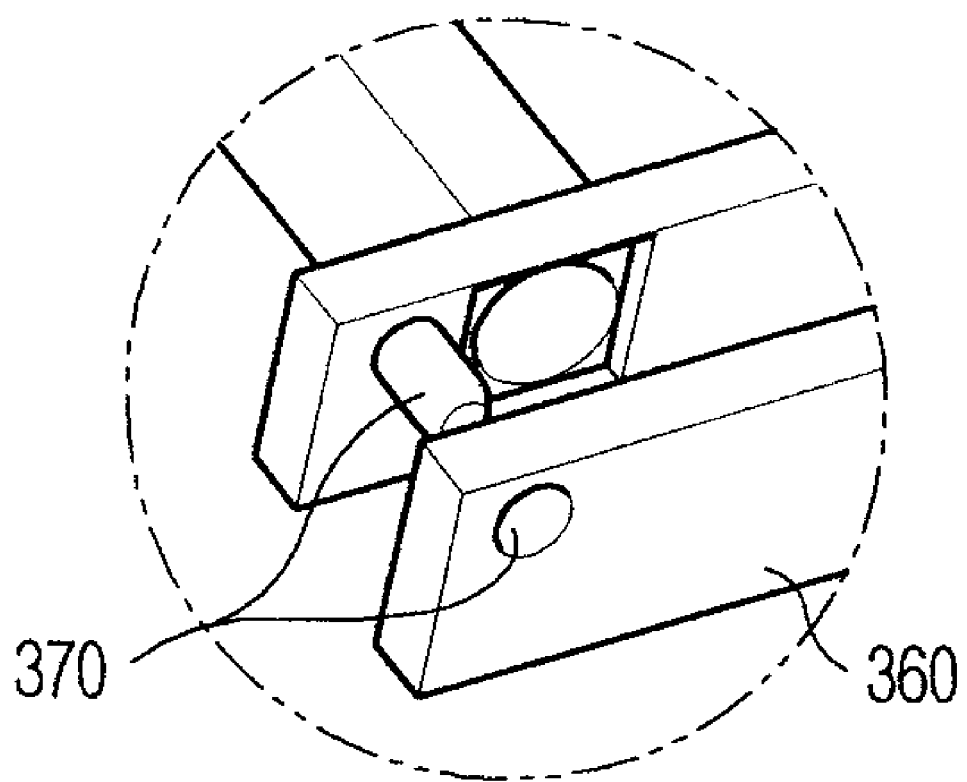
FIG. 17 is an enlarged perspective view of "A" shown in FIG. 16.

FIG. 16 illustrates a structure in which a first light guiding member 310A and a second light guiding member 310B may be connected at opposite ends thereof. As shown, the first light guiding member 310A and the second light guiding member 310A are extruded as an integrally formed body or from the same single mold, e.g., through an injection molding process, and are assembled together. The light source, which irradiates light toward the light guide members 310A and 310B, may also be integrally formed with a single substrate 360. In addition, as shown in FIG. 17, a coupling structure 370 may be provided between the light source substrate 360 and the light guide members 310A and 310B to improve assembling process for the illumination device 100. This extrusion and simultaneous assembly as described above may help to further alleviate the problem of assembling tolerance, simplify assembling work, and decrease production costs.

Figure 18:
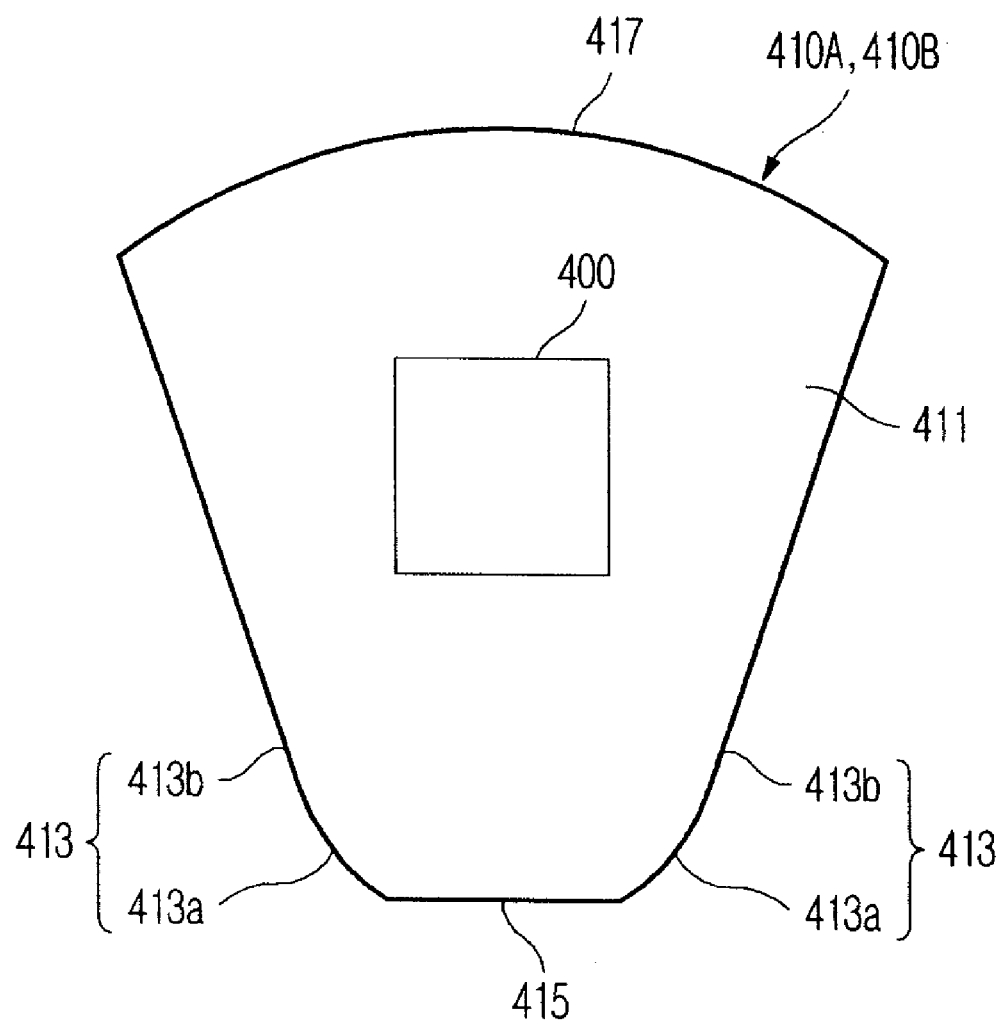
FIG. 18 is a sectional view of a light guide member according to an embodiment of the present invention.

Although the first and second guide surfaces 213a and 213b are shown in FIG. 14 as having linear cross-sectional shapes, the present invention is not so limited. For instance, according to an alternative embodiment, as, e.g., illustrated in FIG. 18, a first guide surface 413a of light guide member 410A and/or 410B may have a curved shape and a second guide surface 413b of the light guide members 410A and 410B may have a linear sectional shape.

Figure 19:
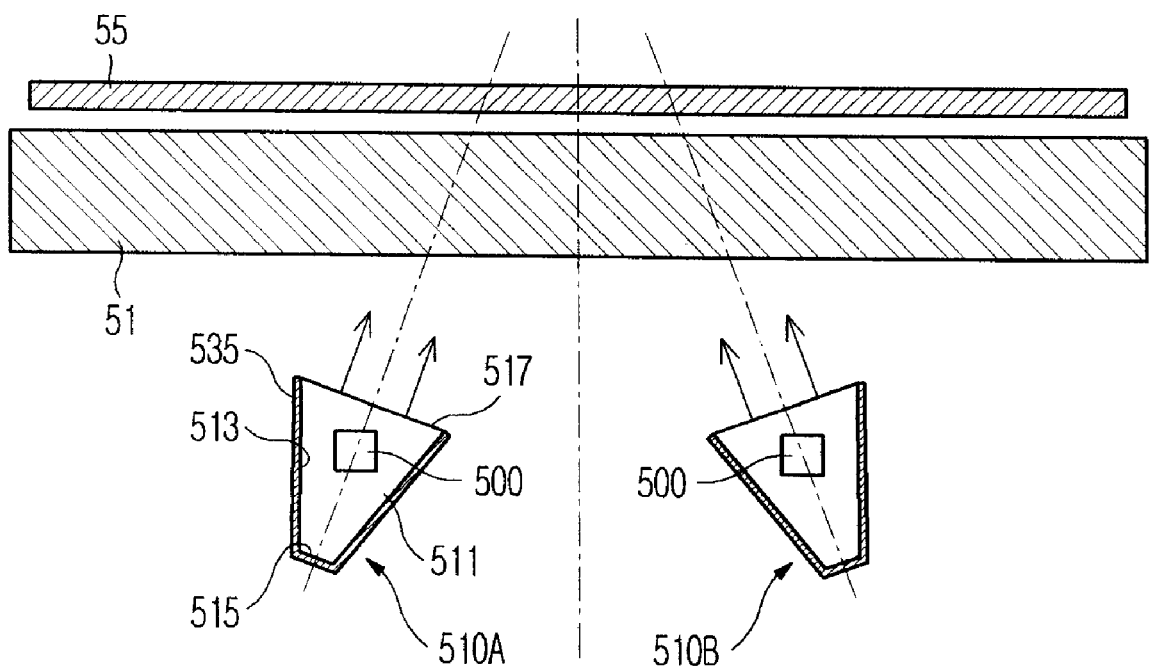
FIG. 19 is a schematic view of an illumination device employed in an image scanning apparatus according to an embodiment of the present invention.

Referring to FIG. 7, while in that figure the scattered reflection is shown and described to occur only at the reflective surface 215 of the light guide members 210A and 210B. However, the present invention is not so limited. For instance, according to another embodiment, as, e.g., shown in FIG. 19, a reflective member 535 is formed on at least one of a reflective surface 515 and a guide surface 513 of light guide members 510A and 510B. Referring to FIG. 19, the reflective member 535 is formed on the guide surface 513 and the reflective surface 515, respectively. The reflective member 535 may be obtained by forming the reflective groove structure on the guide surface 513 or the reflective surface 515 as previously described, or, for example, by coating or printing the guide surface 513 or the reflective surface 515 with a material having high reflectivity of about 90% or more in the wavelength band of the light irradiated from the light source 500. Such material having high reflectivity is generally known in the art, and thus is no described in detailed herein for the sake of brevity.

In addition, although FIG. 7 shows the exit surface 217 in the form of the convex lens having an arcuate shape, the present invention is not so limited. For instance, as shown in FIG. 19, the exit surface may be prepared in the form of a flat lens having a plane shape or a Fresnel lens pattern.

Figure 20:
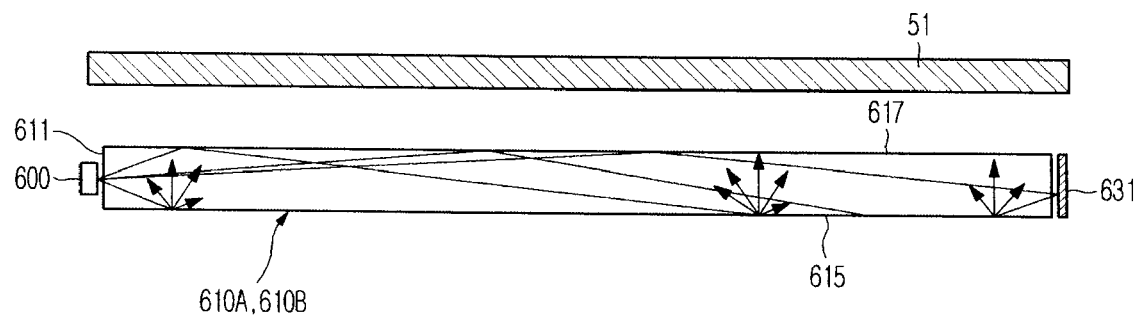
FIG. 20 is a sectional view of an illumination device employed in an image scanning apparatus according to an embodiment of the present invention.

Although FIG. 9 shows the incident surface 211 formed at both longitudinal end portions of the light guide members 210A and 210B, the present invention is not so limited. For instance, according to an embodiment, as shown, e.g., in FIG. 20, a light source 600 may be installed only at one longitudinal end portion of light guide members 610A and/or 610B, so that only one incident surface 611 may be formed on one longitudinal end portion of light guide members 610A and/or 610B. In this case, a reflective plate 631 may be provided at the other longitudinal end portion of light guide members 610A and/or 610B. Thus, the light incident through the incident surface 611 or the reflective surface 615 is reflected into the light guide members 610A and 610B, thereby preventing the light irradiated from the light source 600 from being output through other surfaces.

Figure 21:
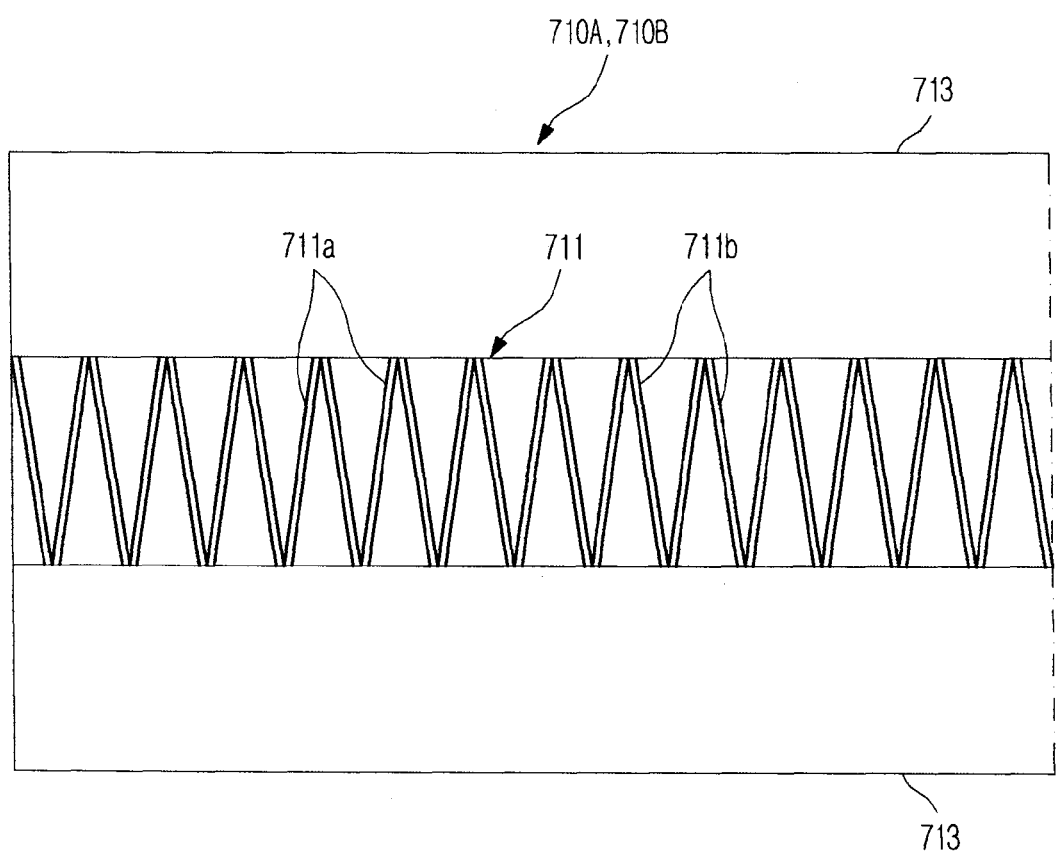
FIG. 21 is a plan view of a light guide member employed in an image scanning apparatus according to an embodiment of the present invention.

In addition, although FIG. 12 shows the first and second reflective grooves 215a and 215b that cross each other as one possible illustrative pattern thereof, the present invention is not so limited. For instance, according to an embodiment as shown, e.g., in FIG. 21, first and second reflective grooves 711a and 711b of a reflective surface 711 may be patterned not to cross each other, but are alternately arranged along the light guide members 710A and 710B, achieving the same beneficial aspects contemplated by the present disclosure.

Figure 22:
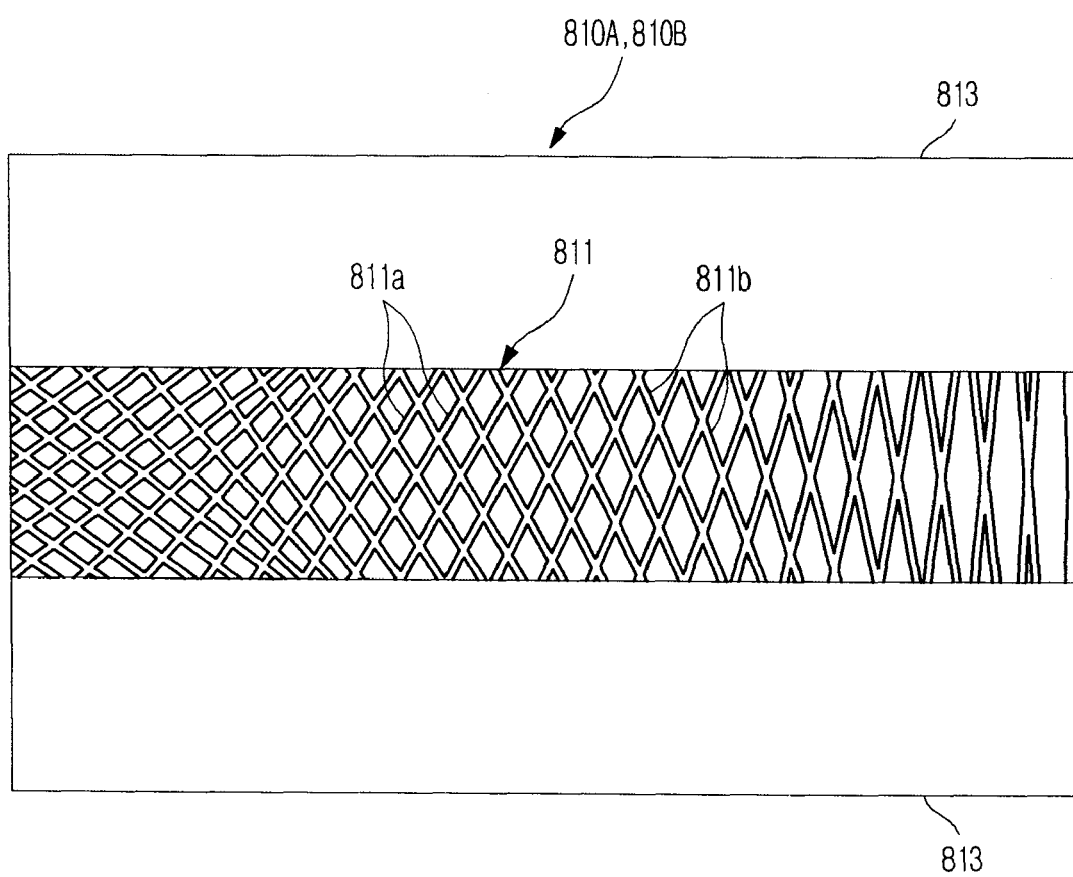
FIG. 22 is a plan view of a light guide member employed in an image scanning apparatus according to an embodiment of the present invention.

While according to the embodiment thus far described, the first and second reflective grooves 215a and 215b are described to have the same inclination angle across the length of the light guide members. However, the present invention is not so limited. The light distribution on the surface of the manuscript may not be uniform in the width direction of the light guide members 210A and 210B at the vicinity of the longitudinal end portions of the light guide members 210A and 210B. Thus, according to an alternative embodiment, as shown, e.g., in FIG. 22, the inclination angle of first and second reflective grooves 811a and 811b formed in a reflective surface 811 may gradually increase from the center towards the ends of light guide members 810A and 810B. In this case, light can be effectively diffused even at the end portiions of the light guide members 810A and 810B.

In addition, the amount of light radiated from the both longitudinal ends of the light guide members 810A and 810B may increase proportionally to the inclination angle of the first and second reflective grooves 811a and 811b formed in the light guide members 810A and 810B. Therefore, if the inclination angle of the first and second reflective grooves 811a and 811b is gradually increased from the center towards the ends of light guide members 810A and 810B as described above, the amount of light irradiated onto the object 55 from the both longitudinal ends of the light guide members 810A and 810B may increase. Thus, there may be a difference between the amount of light irradiated onto the object 55 from the center of the light guide members 810A and 810B and the amount of light irradiated onto the object 55 from the both longitudinal ends of the light guide members 810A and 810B.

Figure 23:
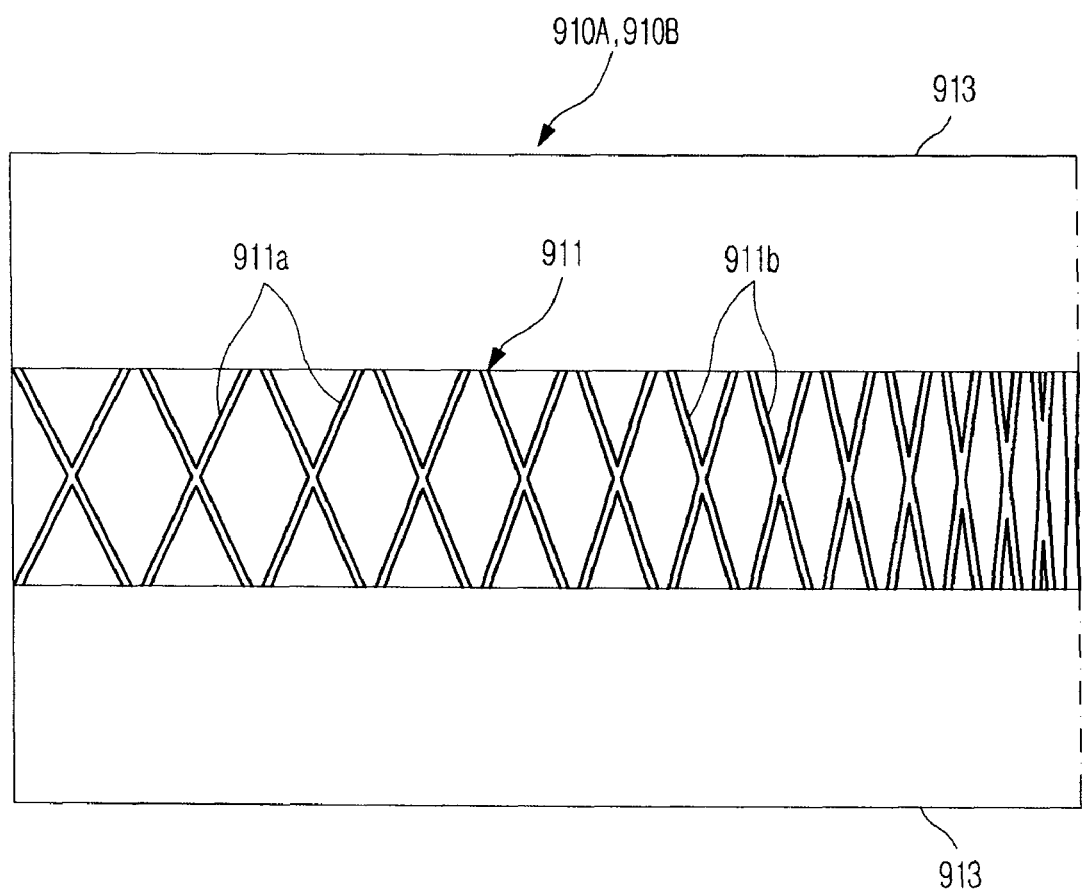
FIG. 23 is a plan view of a light guide member employed in an image scanning apparatus according to an embodiment of the present invention.

In order to address the above difference, according to another embodiment of the present invention, as shown, e.g., in FIG. 23, the inclination angle of the first and second reflective grooves 911a and 911b gradually increases from the center to the both ends of light guide members 910A and 910B, and at the same time, the interval between the first and second reflective grooves 911a and 911b increases proportionally to the inclination angle of the first and second reflective grooves 911a and 911b. In this case, the amount of light radiated onto the object from the both longitudinal ends of the light guide members 910A and 910B may be reduced, so the difference between the amount of light irradiated onto the object 55 from the center of the light guide members 910A and 910B and the amount of light irradiated onto the object 55 from the both longitudinal ends of the light guide members 910A and 910B can be reduced.

While various embodiments have been described in relation to a CCDM, in which the light source and the plural reflection mirrors are integrated in a single module, the present invention can also be applied to an MMT (mirror moving type), in which one light source and one reflection mirror are integrated in a single module and two reflection mirrors are integrated in another single module such that the modules including the mirrors can read the image while moving along the object.

Although few embodiments of the present invention have been shown and described, it would be appreciated by those skilled in the art that changes may be made in these embodiments without departing from the principles and spirit of the invention, the scope of which is defined in the claims and their equivalents. Finally, it is the applicant's intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

What is claimed is:

1. A multi-functional device comprising:
   a document bed; and
   a scanner module operable to scan a document placed on the document bed while moving in a main scan direction, the scanner module including an illuminator to illuminate light onto the document, the illuminator including a first light guiding member extending in a main-scanning direction to direct light received from a first light source onto a surface of the document, and a second light guiding member extending in the main-scanning direction to direct light received from a second light source onto a surface of the document, the first light guiding member and the second light guiding member slantingly arranged in a holder such that a center line of light illuminating the document by the first light guiding member and a center line of light illuminating the document by the second light guiding member are spaced apart from each other,
   wherein each of the first and second light guiding members has an incident surface through which the light emitted from one of the light sources is incident, a reflecting surface adapted to reflect the light received through the incident surface, guiding surfaces to guide the incident light, and an exit surface opposite to the reflecting surface to allow light reflected by the reflecting surface and the guiding surface to exit,
   a surface area of the exit surface is greater than a surface area of the reflecting surface, and
   the reflecting surface of each of the first and second light guiding members is provided with a plurality of reflective elements which are not uniformly distributed in the main-scanning direction thereof such that a spacing distance between adjacent reflective elements progressively increases from a center of the light guiding member towards a first end of the light guiding member having the incident surface, the reflective elements to diffuse and reflect light received from one of the light sources, and
   the exit surface of each of the first and second light guiding members is provided as a convex lens having an arc-shaped section with a predetermined curvature.

2. The multi-functional device according to claim 1, wherein each of the first and second light guiding members is adapted to prevent light from being output through an end opposite to the incident surface.

3. The multi-functional device according to claim 2, wherein each of the first and second light guiding members is provided with a reflecting plate at the end opposite to the incident surface to prevent light from being output through the end opposite to the incident surface.

4. The multi-functional device according to claim 3, wherein the first and second light guiding members are extruded as an integral single body so that end portions thereof are connected to each other.

5. The multi-functional device according to claim 2, wherein the illuminated area of the document comprises a first illuminated area and a second illuminated area, and the first light guiding member illuminates the first area and a second light guiding member illuminates the second area.

6. The multi-functional device according to claim 5, wherein an amount of light illuminating the document is maximized at respective center positions of the first and second illuminated areas.

7. The multi-functional device according to claim 6, wherein a total light illuminating the first and second illuminated areas is substantially uniform regardless of a distance between a center position of the first area and a center position of the second area.

8. The multi-functional device according to claim 7, further comprising a sensor unit including a plurality of image sensors provided in plural rows, the plurality of image sensors being spaced apart from each other at a predetermined distance.

9. The multi-functional device according to claim 8, further comprising a plurality of reflecting mirrors positioned between the document and an imaging lens, the reflecting mirrors being configured to reflect the light from the document and change a direction of the light traveling from the document.

10. The multi-functional device according to claim 9, further comprising an aperture stop positioned between the illuminator and the plurality of reflecting mirrors, the aperture stop being configured to regulate light traveling toward the sensor unit.

11. The multi-functional device according to claim 1, wherein the plurality of reflective elements comprise a plurality of reflective grooves to diffuse and reflect light received from one of the light sources.

12. The multi-functional device according to claim 1, wherein the incident surface is formed on one end of the light guiding member, and a reflecting plate is provided on the other end of the light guiding member, the reflecting plate reflecting the light incident on the incident surface or the light reflected by the reflecting surface towards the light guiding member.

13. The multi-functional device according to claim 1, wherein the exit surface has a condensing lens shape to condense the light exiting onto the document.

14. The multi-functional device according to claim 1, wherein the reflecting surface has a saw-toothed pattern formed on the reflecting surface.

15. The multi-functional device according to claim 1, wherein the light source comprises a light emitting diode.

16. The multi-functional device according to claim 1, wherein the spacing distance includes a spacing distance between each adjacent reflective element among the plurality of reflective elements that progressively increases from a center of the light guiding member towards a first end of the light guiding member having the incident surface.

17. An image scanning apparatus comprising:
a scanner module operable to scan a document placed on a document bed of the image scanning apparatus while moving in a main scan direction, the scanner module comprising:
an illuminator configured to illuminate the document, the illuminator comprising:
a first light source configured to emit a first light;
a second light source configured to emit a second light;
a first light guiding member extending in a main-scanning direction and configured to direct the first light emitted from the first light source onto a surface of the document;
a second light guiding member extending in the main-scanning direction to direct the second light received from the second light source onto a surface of the document,
wherein the first light guiding member and the second light guiding member are each slantingly arranged in a holder such that a first center line of the first light from the first light source that illuminates the document is spaced apart from a second center line of the second light from the second light source that illuminates the document,
wherein each of the first and second light guiding members comprises:
an incident surface through which at least one of the first and second light is incident;
a reflecting surface having a plurality of reflective elements that are asymmetrically distributed in the main-scanning direction such that a spacing distance between adjacent reflective elements is progressively increased from a center of the light guiding member towards a first end of the light guiding member having the incident surface, the reflective elements to diffuse and reflect the first and second light from the first and second light sources and passing through the incident surface;
a plurality of guiding surfaces to guide the incident light; and
an exit surface opposite the reflecting surface and having a surface area being greater than a surface of the reflecting surface to allow light reflected by the reflecting surface and the guiding surface to exit, the exit surface of each of the first and second light guiding members being provided as a convex lens having an arc-shaped section with a predetermined curvature, and
an image processor configured to process an image obtained by the scanner module.

18. The image scanning apparatus according to claim 17, wherein the image processor comprises at least one of:
a file creating component configured to create an image file from the obtained image; and an image forming component configured to form a printing image corresponding to the obtained image on a printing medium.

19. The image scanning apparatus according to claim 17, wherein each of the first and second light guiding members is adapted to prevent light from being output through an end opposite to the incident surface.

20. The image scanning apparatus according to claim 17, wherein an amount of light illuminating the document is maximized at the first and second center lines.

21. The image scanning apparatus according to claim 20, wherein a total light illuminating the document is substantially uniform regardless of a distance between the center position of the first area and the center position of the second area.

22. The image scanning apparatus according to claim 17, wherein the light source comprises a light emitting diode.

23. The image scanning apparatus according to claim 17, wherein the plurality of reflective elements include a plurality of reflective grooves to diffuse and reflect light received from one of the first and second light sources.

24. The image scanning apparatus according to claim 17, wherein the incident surface is formed on one end of each of the first and second light guiding members, and a reflecting plate is provided on the other end of each of the first and second light guiding members, the reflecting plate reflecting at least one of the light incident on the incident surface and the light reflected by the reflecting surface towards the at least one of the first and second light guiding members.

25. The image scanning apparatus according to claim 17, wherein the exit surface has a condensing lens shape to condense the light exiting onto the document.

26. The image scanning apparatus according to claim 17, wherein the reflecting surface has a saw-toothed pattern formed on the reflecting surface.

27. The image scanning apparatus of claim 17, wherein the spacing distance includes a spacing distance between each adjacent reflective element among the plurality of reflective elements that progressively increases from a center of the light guiding member towards a first end of the light guiding member having the incident surface.

* * * * *